(12) United States Patent
Gault et al.

(10) Patent No.: US 9,740,245 B2
(45) Date of Patent: Aug. 22, 2017

(54) LOCKING MECHANISM

(71) Applicant: Microsoft Technology Licensing, LLC, Redmond, WA (US)

(72) Inventors: Joseph Benjamin Gault, Seattle, WA (US); Scott Douglas Bowers, Woodinville, WA (US); John Stephen Campbell, Spanaway, WA (US); Anthony E. Hillyerd, Sammamish, WA (US); Yazan Aldehayyat, Seattle, WA (US); Karsten Aagaard, Monroe, WA (US); Eric Paul Witt, Redmond, WA (US)

( * ) Notice: Subject to any disclaimer, the term of this patent is extended or adjusted under 35 U.S.C. 154(b) by 0 days.

(21) Appl. No.: 14/956,118

(22) Filed: Dec. 1, 2015

(65) Prior Publication Data

US 2017/0097663 A1    Apr. 6, 2017

Related U.S. Application Data

(60) Provisional application No. 62/237,508, filed on Oct. 5, 2015.

(51) Int. Cl.
  *G06F 1/16*   (2006.01)
  *H05K 5/00*   (2006.01)
  *H05K 7/00*   (2006.01)

(52) U.S. Cl.
  CPC .......... *G06F 1/1679* (2013.01); *G06F 1/1635* (2013.01); *G06F 1/1637* (2013.01); *G06F 1/1662* (2013.01)

(58) Field of Classification Search
  CPC .............................. G06F 1/1632; G06F 1/1654
  USPC ............ 361/679.27, 679.28, 679.29, 679.05, 361/679.41, 679.42, 679.43, 679.44
  See application file for complete search history.

(56) References Cited

U.S. PATENT DOCUMENTS

| | | |
|---|---|---|
| 4,131,378 A | 12/1978 | Daws |
| 5,510,957 A | 4/1996 | Takagi |
| 6,530,784 B1 | 3/2003 | Yim et al. |
| 6,583,985 B2 | 6/2003 | Nguyen et al. |
| 6,771,494 B2 | 8/2004 | Shimano |
| 6,781,819 B2 | 8/2004 | Yang et al. |

(Continued)

OTHER PUBLICATIONS

Hollister, Sean, "Lenovo ThinkPad Helix Tablet / Laptop Hybrid gets a Power-Up when it Docks", Published on: Jan. 6, 2013, Available at: http://www.theverge.com/2013/1/6/3844010/lenovo-thinkpad-helix-convertible.

(Continued)

*Primary Examiner* — Anthony Haughton
(74) *Attorney, Agent, or Firm* — Ray Quinney & Nebeker, P.C.; Paul Taylor; Qudus Olaniran

(57) ABSTRACT

A computing device is described. The computing device may include a first portion and a second portion separably connected to the first portion. A locking mechanism may be configured to lock the first portion to the second portion. The locking mechanism may include a locking receptacle connected to the first portion and a locking protrusion connected to the second portion. The locking receptacle may include a rotating lock and may have an aperture through which the locking protrusion is insertable. The computing device may include an actuator mechanically coupled to the locking mechanism and configured to unlock the first portion from the second portion.

20 Claims, 14 Drawing Sheets

(56) References Cited

U.S. PATENT DOCUMENTS

| | | | |
|---|---|---|---|
| 6,845,005 B2 | 1/2005 | Shimano et al. | |
| 6,944,012 B2 | 9/2005 | Doczy et al. | |
| 8,827,331 B2 | 9/2014 | Corcoran et al. | |
| 8,947,861 B2 | 2/2015 | Staats et al. | |
| 9,069,527 B2 | 6/2015 | Leong et al. | |
| 2005/0046374 A1 | 3/2005 | Ogawa et al. | |
| 2008/0127684 A1 | 6/2008 | Rudduck et al. | |
| 2013/0021738 A1 | 1/2013 | Yang et al. | |
| 2014/0130316 A1 | 5/2014 | Rudduck et al. | |
| 2014/0347802 A1* | 11/2014 | Lee | G06F 1/1626 361/679.17 |
| 2014/0362509 A1 | 12/2014 | Lin | |
| 2015/0055289 A1* | 2/2015 | Chang | G06F 1/1632 361/679.43 |
| 2015/0116926 A1* | 4/2015 | Robinson | G06F 1/1632 361/679.43 |
| 2016/0004279 A1* | 1/2016 | Delpier | G06F 1/1632 361/679.26 |
| 2016/0062411 A1* | 3/2016 | Morrison | G06F 1/1632 361/679.08 |

OTHER PUBLICATIONS

International Search Report and Written Opinion issued in PCT Application No. PCT/US2016/053858, mailed Dec. 9, 2016.

* cited by examiner

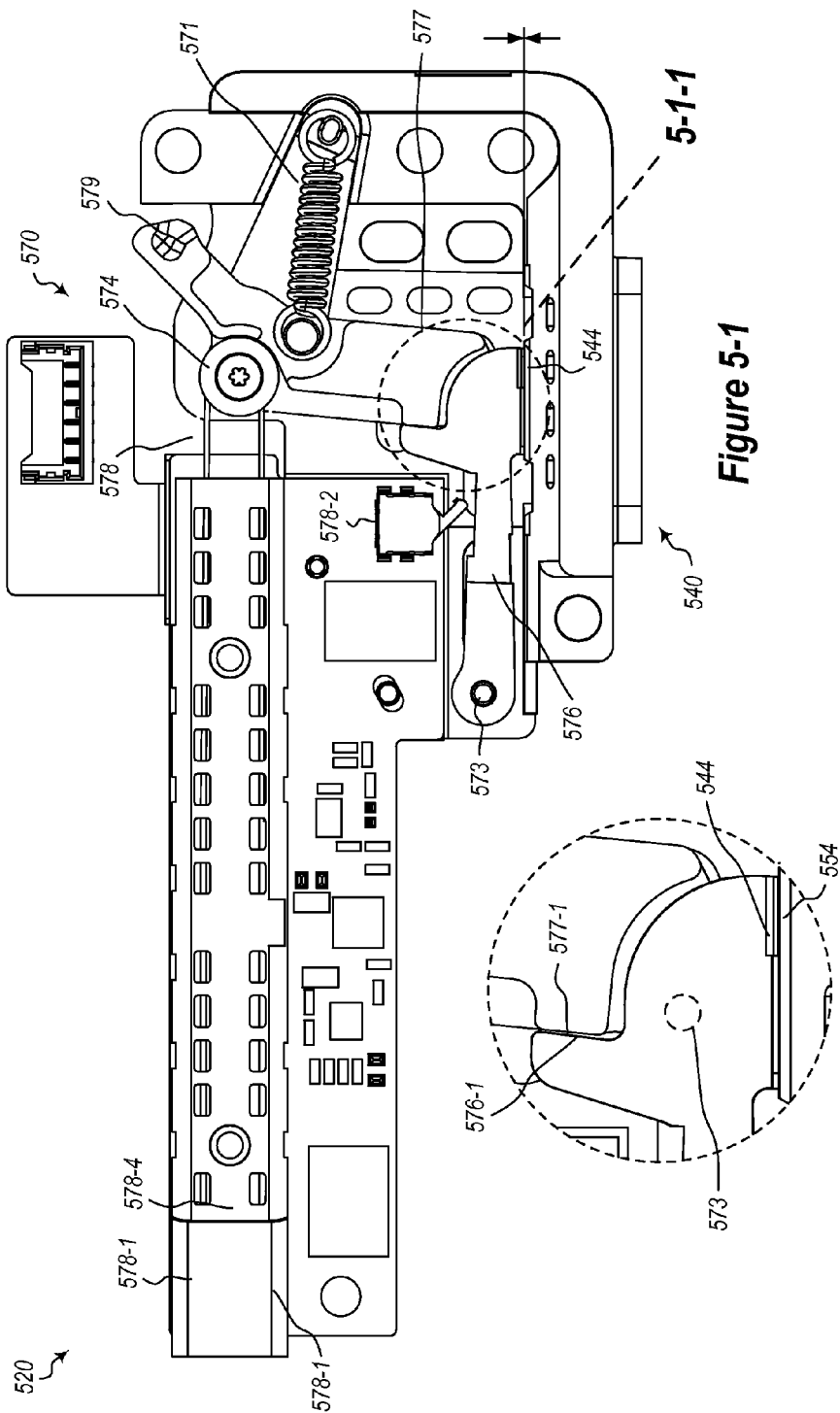

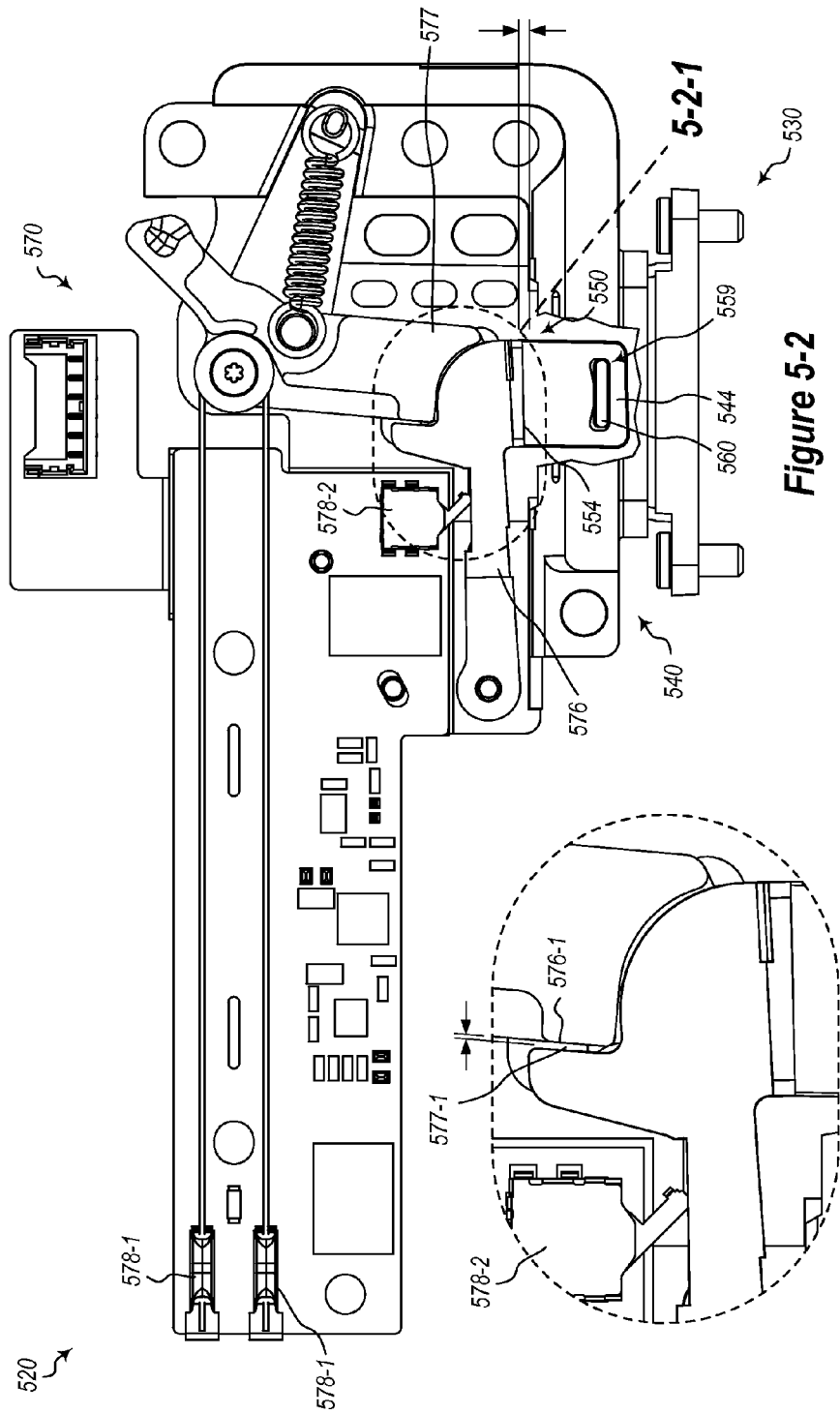

LOCKING MECHANISM

CROSS-REFERENCE TO RELATED APPLICATIONS

This application claims the benefit of and priority to U.S. Provisional Patent Application Ser. No. 62/237,508, entitled "LOCKING MECHANISM", filed Oct. 5, 2015 which is incorporated by reference herein in its entirety.

BACKGROUND

Background and Relevant Art

Use of computing devices is becoming more ubiquitous by the day. Computing devices range from standard desktop computers to wearable computing technology and beyond. One area of computing devices that has grown in recent years is the hybrid computers. Hybrid computers may act as a tablet computer or a laptop computer. Many hybrid computers include input devices that may be separated from the screen.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a computing device. The computing device includes a first portion and a second portion separably connected to the first portion. A locking mechanism is configured to lock the first portion to the second portion. The locking mechanism may include a locking receptacle connected to the first portion and a locking protrusion connected to the second portion. The locking receptacle may include a rotating lock and may have an aperture through which the locking protrusion is insertable. The computing device includes an actuator mechanically coupled to the locking mechanism and configured to unlock the first portion from the second portion.

One embodiment illustrated herein includes a computing device having a first portion and a second portion separably connected to the first portion. The computing device may include a locking mechanism configured to lock the first portion to the second portion. The computing device may include an actuator mechanically coupled to the locking mechanism and configured to unlock the first portion from the second portion. The computing device may include a processor in electronic communication with the actuator. The computing device may include memory including instructions that are executable by the processor to cause the actuator to unlock the locking mechanism upon receipt of an instruction to unlock.

One embodiment illustrated herein includes a computing device. The computing device may include a first portion that includes a display screen and a second portion that includes an input device and that is separably connected to the first portion. The computing device may include a locking mechanism configured to lock the first portion to the second portion. The locking mechanism may include a locking receptacle connected to the first portion and a locking protrusion connected to the second portion. The locking receptacle may include a rotating lock. The locking receptacle may have an aperture through which the locking protrusion is insertable. The computing device may include an actuator mechanically coupled to the locking mechanism and configured to unlock the first portion from the second portion. The actuator may include a shape memory alloy (SMA) wire and a heating element connected to the SMA wire. The computing device may include one or more magnets proximate the locking mechanism. The computing device may include a processor in electronic communication with the actuator and programmed to cause the actuator to unlock the locking mechanism upon receipt of an instruction to unlock by heating the SMA wire.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 3-1 is a cutaway side view of an embodiment of a locking mechanism in an undocked configuration;

FIG. 3-1-1 is a zoom-in-view of a portion of the locking mechanism in FIG. 3-1;

FIG. 3-2 is a cutaway side view of the embodiment of a locking mechanism in FIG. 3-1 in a locked configuration;

FIG. 3-2-1 is a zoom-in-view of a portion of the locking mechanism in FIG. 3-2;

FIG. 3-3 is a cutaway side view of the embodiment of a locking mechanism in FIG. 3-1 in an unlocked configuration;

FIG. 4-1 is a front view of another embodiment of a locking mechanism shown in an undocked configuration;

FIG. 4-2 is a front view of the embodiment of a locking mechanism of FIG. 4-1 shown in a locked configuration;

FIG. 4-3 is a front view of the embodiment of a locking mechanism of FIG. 4-1 shown in an unlocked configuration;

FIG. 5-1 is a front view of a further embodiment of a locking mechanism shown in an undocked configuration;

FIG. 5-1-1 is a zoom-in-view of a portion of the locking mechanism in FIG. 5-1;

FIG. 5-2 is a front view of the embodiment of a locking mechanism of FIG. 5-1 shown in a locked configuration;

FIG. 5-2-1 is a zoom-in-view of a portion of the locking mechanism in FIG. 5-2;

FIG. 5-3 is a front view of the embodiment of a locking mechanism of FIG. 5-1 shown in an unlocked configuration;

FIG. 5-3-1 is a zoom-in-view of a portion of the locking mechanism in FIG. 5-3;

DETAILED DESCRIPTION

This disclosure generally relates to devices, systems, and methods for locking two parts together. More particularly, this disclosure generally relates to computing devices with two portions that may be locked together by a locking mechanism and methods of use.

Figure 1:
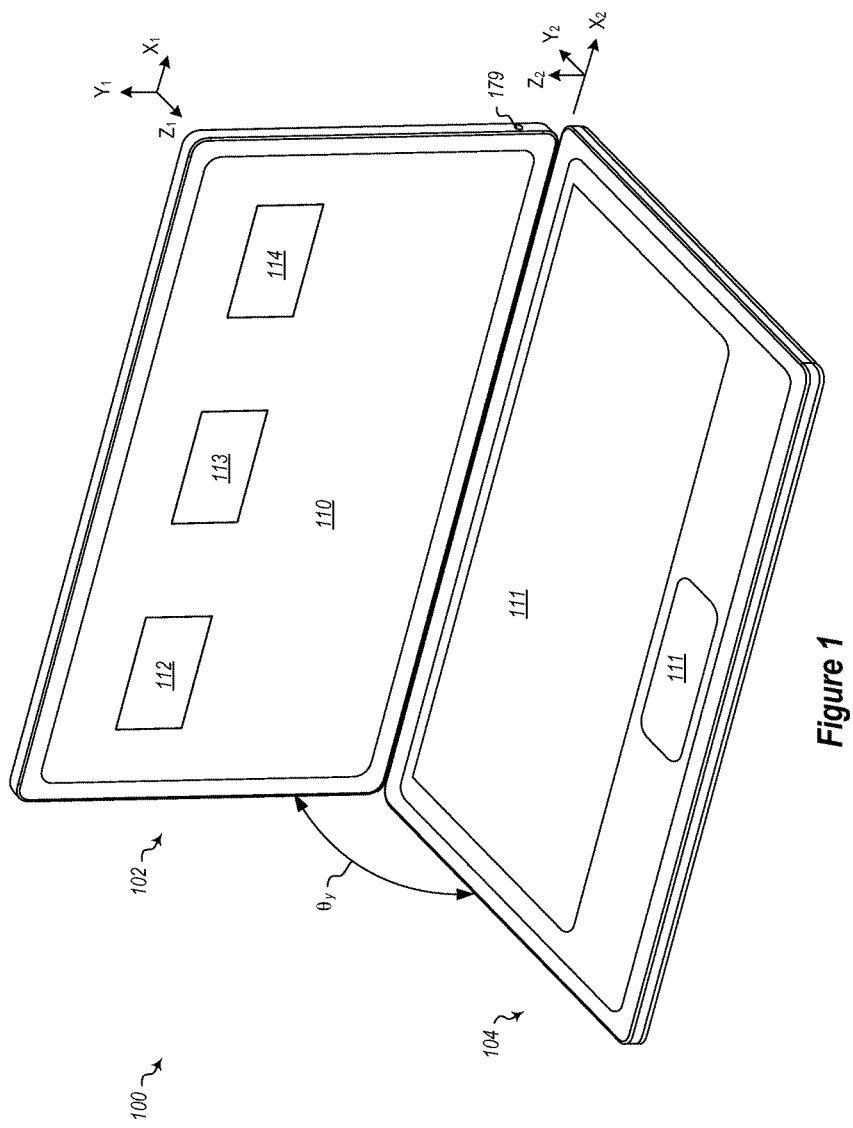
FIG. 1 is an isometric view of an embodiment of a computing device.
Figure 2:
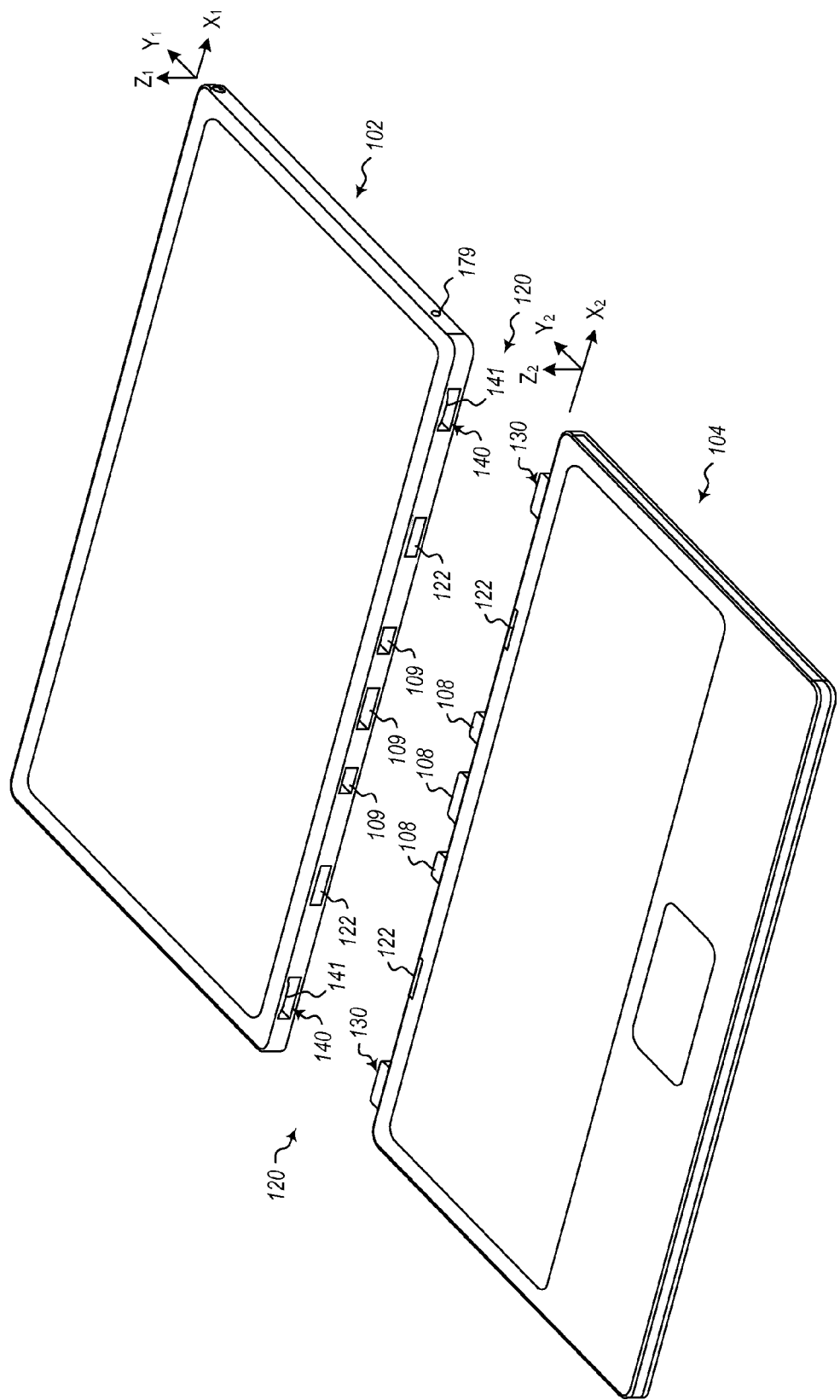
FIG. 2 is an isometric perspective separated view of the embodiment of a computing device in FIG. 1.

FIG. 1 is an isometric view of an embodiment of a computing device 100 and FIG. 2 is an isometric perspective separated view of the embodiment of a computing device 100 in FIG. 1. Referring generally to the computing device 100 shown in FIGS. 1 and 2, the computing device 100 may include a first portion 102 and a second portion 104. The first portion 102 may be separably connected to the second portion 104 by a locking mechanism 120. For example, the first portion 102 may be mechanically connected to the second portion 104 in a docked (and/or locked) configuration, such as the docked configuration shown in FIG. 1. The first portion 102 may transition from the docked configuration to an undocked configuration, such as the undocked configuration shown in FIG. 2. The first portion 102 and the second portion 104 may transition from the connected to the undocked configuration and from the unconnected to the docked configuration.

The locking mechanism 120 may include a locking protrusion 130 and a locking receptacle 140 (shown in FIG. 2). The locking receptacle 140 may include an aperture 141 through which the locking protrusion 130 may be inserted.

By way of orientation, a first coordinate system 1-1 (including the $x_1$-direction, the $y_1$-direction, and the $z_1$-direction) is provided for the first portion 102 and a second coordinate system 1-2 (including the $x_2$-direction, the $y_2$-direction, and the $z_2$-direction) is provided for the second portion 104. In the illustrated configuration, these coordinate systems 1-1, 1-2 are rotated about their respective x-axes. When the angle ($\theta_x$) between the first portion 102 and the second portion 104 is one-hundred and eighty degrees, the $x_1$ and $x_2$ axes are parallel, the $y_1$ and the $y_2$ axes, and the $z_1$ and the $z_2$ axes are parallel. When the angle ($\theta_x$) between the first portion 102 and the second portion 104 is ninety degrees, the $x_1$ and $x_2$ axes are parallel, the $y_1$ and the $z_2$ axes are parallel, and the $z_1$ and the $y_2$ axes are parallel (but opposite (e.g., positive values extending in opposite directions)). For ease of description, front is the positive z-direction, back is the negative z-direction, top is the positive y-direction, bottom is the negative y-direction, right is the positive x-direction, and left is the negative x-direction. Although not shown in the remaining figures, similar orientation will be used for ease of description.

The first portion 102 may include a display 110. The display 110 may be a touch sensitive display screen. The second portion 104 may include an input device 111. The input device 111 may include a keyboard, touchpad, one or more buttons, other input devices, or combinations thereof that may be used to provide input to the processor 112. Although a hybrid computing device is shown, the present invention may be used with other computing devices where two portions are separably connected together. For example, the first portion 102 may be a mobile phone and the second portion 104 may be a cover, a keyboard, or other device. In other embodiments, the locking mechanisms described herein may be used in a non-computing (e.g., purely mechanical) environment.

Although FIG. 1 and FIG. 2 illustrate the display 110 of the first portion 102 and the input device 111 of the second portion 104 as facing each other (e.g., both being on the front side of their respective portions), in at least one embodiment described herein, the first portion 102 and second portion 104 may be reversible. For example, the first portion 102 may connect to the second portion 104 as shown (e.g., with the display 110 facing the front) and may be undocked, rotated 180 degrees, and docked to the second portion 104 such that the first portion 102 faces the opposite direction (e.g., with the display 110 facing the back). Thus, the locking mechanism 120 may be configured to allow a reversible connection between the first portion 102 and the second portion 104.

The first portion 102 and/or the second portion 104 may include a processor 112, memory 113, a battery 114, other computing components, or combinations thereof. For example, as shown, the first portion 102 may include a processor 112, memory 113, and a battery 114 while the second portion 104 may also include a processor 112. In some embodiments, only one of the first portion 102 or the second portion 104 may include a processor 112. In other embodiments, both of the first portion 102 and the second portion 104 include a processor 112. In further embodiments, one or more computing components (e.g., processors 112, memory 113, and battery 114) may be included in the first portion 102 and/or the second portion 104 in any combination.

The computing components in the second portion 104 may be in electronic communication with one or more of the computing components in the first portion 102. For example, as shown in FIG. 2, the first portion 102 and the second portion 104 may be in electronic communication via a physical electrical connector that includes an electrical protrusion 108 and an electrical receptacle 109. Further examples of physical electrical connectors may be found in co-pending U.S. patent application Ser. No. 14/716,598, which is hereby incorporated by reference in its entirety.

As shown in FIG. 2, one or more electrical protrusions 108 are located on the second portion 104 and one or more electrical receptacles 109 are located on the first portion 102. In other embodiments, one or more electrical receptacles 109 are located on the second portion 104 and one or more electrical protrusions 108 are located on the first portion 102. In further embodiments, the first portion 102 and the second portion 104 may include one or more electrical receptacles 109 and one or more electrical protrusions 108, such that each of the first portion 102 and second portion 104 may include a combination of electrical receptacles 109 and electrical protrusions 108.

The electrical protrusions 108 and/or electrical receptacles 109 may include various electrical connections. As shown, the electrical protrusions 108 and electrical receptacles 109 include multiple pin connectors. In embodiments where computing components (e.g., the processor 112, memory 113, or battery 114) are on separate portions (e.g., first portion 102 and second portion 104), maintaining electrical communication between the first portion 102 and the second portion 104 may be important. For example, if a computing component on the second portion 104 were to lose electrical communication with an electrical component on the first portion 102, the computing device 100 may fail (e.g., an operating system, such as Windows 10 available from Microsoft Corporation of Redmond, Wash., may crash or a computing component may be affected by a power surge when the electrical connection is restored). Some electrical connections may be sensitive (e.g., high speed). Thus, in some embodiments, it may be desirable for the first portion 102 and the second portion 104 to be securely connected together in the docked configuration by a locking mechanism 120. The locking mechanism 120 may include a locking protrusion 130 and a locking receptacle 140 and may include a magnet 122, which will be described in more detail below. Furthermore, in some embodiments, it may be desirable for a computing component (e.g., the processor 112, memory 113, or battery 114) in the second portion 104 to hand off its responsibilities to a computing component (e.g., the processor 112, memory 113, or battery 114) on the first portion 102 (or vice versa) before undocking from the first portion 102.

The disclosure will now turn to a discussion of the different aspects of a secure connection. A secure connection may include one or more of: a minimal gap between the first portion 102 and the second portion 104, a secure lock, minimal free play (i.e., backlash) about $\theta_x$ (e.g., about the axis extending between the connection of the first and second portions 102, 104), minimal free play (i.e., backlash) in the y-direction (e.g., along the axis from the top to the bottom of the first portion 102). In addition or in the alternative, in some embodiments it may be desirable for the insertion force required to insert the locking protrusion 130 into the locking receptacle 140 (including a lock, such as a rolling lock 360, and/or other locking components) to be minimal. In additional or alternative embodiments, it may be desirable to provide one or elements of a secure connection (e.g., a minimal gap, a secure lock, minimal free play about $\theta_x$, minimal free play in the y-direction) and/or minimal required insertion force with minimal numbers of locking elements (e.g., locking protrusions 130) in each locking receptacle 140 of each locking mechanism 120. For example, it may be desirable that only two locking elements be abutting (e.g., one locking protrusion 130 and one rotating lock 360 described below) within a single locking receptacle 140.

In at least one embodiment, the gap (e.g., the distance in the y-direction between the first portion 102 and the second portion 104) between the first portion 102 and the second portion 104 in the docked configuration is less than 0.1 mm. Having a gap less than 0.1 mm may be desirable for aesthetic and/or functional reasons. For example, for the electrical connection on the electrical protrusions 108 and the electrical connection on the electrical receptacles 109 to remain in contact, the gap should be small. In at least one embodiment described herein, a gap of 0.1 mm may be achieved while providing free play about $\theta_x$ of less than 1.5 degrees. The gap may be dependent on the type of locking mechanism 120 used and/or the tolerances (e.g., the differences in the actual dimensions from the desired dimensions of the design) designed into the locking components of the locking mechanism 120.

A secure lock is the resistance of the locking mechanism 120 to forces applied in the y-direction. For example, a secure lock may resist movement between the first portion 102 and the second portion 104 when a tension force is applied between the first portion 102 and the second portion 104. In some embodiments, the tension force may be resisted without losing electrical communication between the first portion 102 and the second portion 104. In some embodiments, the tension force may be resisted without plastically deforming locking components of the locking mechanism 120. In some embodiments, the first portion 102 and the second portion 104 may be parallel (e.g., when the $y_1$ and $y_2$ axes are parallel). In other embodiments, the first portion 102 and the second portion 104 may be limited in rotation about $\theta_x$. For example, In at least one embodiment, a single locking mechanism 120 is capable of resisting a tensile force of 57 millinewtons or less applied to the locking mechanism in the y-direction without moving (e.g., less than one micron of movement) in the y-direction. In at least one embodiment, a single locking mechanism 120 is capable of resisting a tensile force of 4 Newtons or less applied to the locking mechanism in the y-direction without substantial movement (e.g., less than 75 microns of movement) in the y-direction. In at least one embodiment, a single locking mechanism 120 (e.g., one locking protrusion 130 and one locking receptacle 140) is capable of resisting a tensile force of 70 Newtons or less applied to the locking mechanism in the y-direction with minimal movement (e.g., less than 1 mm of movement) in the y-direction. In embodiments where magnets 122 are used, then there would be no movement (e.g., not one micron of movement) in the y-direction until the force applied by the magnet 122 is overcome. For example, if the magnet 122 applied 16 Newtons of force in the y-direction, then, in at least one embodiment, a single locking mechanism 120 is capable of resisting 16 Newtons force with no movement (e.g., not one micron of movement), 4 Newtons of force without substantial movement (e.g., less than 75 microns of movement), and 70 Newtons of force with minimal movement (e.g., less than 1 mm of movement) in the y-direction.

Free play (i.e., backlash) about $\theta_x$ is movement of the locking receptacle 140 with respect to the locking protrusion 130 in the $\theta_x$ direction when a force is applied to cause motion about the x-axis. For example, when a user pushes on the top of the first portion 102 with a small force (e.g., 1 Newton), the free play of the entire computing device 100 is the amount of angular displacement ($\theta_x$) about the hinge. It should be noted that the applied force and/or the free play about $\theta_x$ may be in either direction (e.g., in the positive or negative z-direction or $\theta_x$ direction). Thus, it may be desirable, in some embodiments, to reduce the amount of free play of the locking protrusion 130 about $\theta_x$. The free play of the locking protrusion 130 about $\theta_x$ is different than the free play of the computing device 100 about $\theta_x$. For example, the free play of the computing device 100 about $\theta_x$ may include the compliance of the entire first portion 102 (e.g., the materials that form the first portion), compliance of the entire second portion 104, and compliance and/or free play of a hinge (examples of such a hinge may be found in co-pending U.S. patent application Ser. No. 14/538,786, as well as the locking mechanism 120. The free play of the locking protrusion 130 about $\theta_x$ is limited only to the components of the locking mechanism 120 (e.g., the locking protrusion 130, locking receptacle 140, other locking elements, or combinations thereof).

In at least one embodiment, the free play about $\theta_x$ of the locking protrusion 130 is small. For example, in at least one embodiment, the free play about $\theta_x$ may be small (e.g., less than 1.5 degrees) when a 200 N-mm torque is applied in the positive or negative $\theta_x$-direction. In at least one embodiment, the free play about $\theta_x$ may be minimal (e.g., less than 1 degree) when a 200 N-mm torque is applied in the positive or negative $\theta_x$-direction. In at least one embodiment, the free play about $\theta_x$ may be substantially zero (e.g., less than 0.5 degrees) when a 200 N-mm torque is applied in the positive or negative $\theta_x$-direction. In at least one embodiment, the free play about $\theta_x$ may be zero (e.g., less than 0.1 degrees) when a 200 N-mm torque is applied in the positive or negative $\theta_x$-direction.

Free play (i.e., backlash) in the y-direction of the locking mechanism 120 is movement in the y-direction when a tensile force is applied in the y-direction. For example, when a user pulls on the top of the first portion 102 and the bottom of the second portion 104 with a small force (e.g., 1 Newton), the free play of the locking mechanism 120 in the y-direction is the distance between the first portion 102 and the second portion 104. Free play in the y-direction differs from the gap described above in that free play in the y-direction is the static distance between the first portion 102 and the second portion 104 when locked. Free play in the y-direction is the distance that the first portion 102 and the second portion 104 are separated by when a small force (e.g., 1 Newton) is applied in the y-direction. In some embodiments, free play in the y-direction may interrupt electrical communication between the first portion and the second portion. In further embodiments, free play in the y-direction may affect the user experience. Thus, it may be desirable, in some embodiments, to reduce the amount of free play of the locking receptacle 140 with respect to the locking protrusion 130 in the y-direction. For example, in at least one embodiment, a single locking mechanism 120 is capable of limiting travel to less than 75 microns of movement in the y-direction when a tensile force of 4 Newtons or less applied to the locking mechanism in the y-direction.

In at least one embodiment, the free play of the locking mechanism 120 in the y-direction is small (e.g., less than 0.5 mm) when a 1 Newton tensile force is applied in the y-direction. In at least one embodiment, the free play in the y-direction may be substantially zero (e.g., less than 18 microns) when a 1 Newton tensile force is applied in the y-direction. In at least one embodiment, the free play in the y-direction may be zero (e.g., less than 5 microns) when a 1 Newton tensile force is applied in the y-direction. In some embodiments, the free play in the y-direction may be less than between 5 microns and 0.5 mm.

The insertion force is the force required to insert the locking protrusion 130 into the locking receptacle 140. The insertion force is the force applied by the user and is exclusive of the force of gravity (e.g., the weight of the first portion 102) and/or magnetic forces (e.g., in embodiments that include magnets 122). The insertion force required to insert the locking protrusion 130 into the locking receptacle 140 such that the locking protrusion 130 is locked within the locking receptacle 140 may be sufficient to overcome friction between the locking protrusion 130 and the locking receptacle 140, to overcome forces applied against the locking protrusion 130 by other locking components (e.g., rotating lock 360 described below), other forces, or combinations thereof. In at least one embodiment, the insertion force applied by the user may be small (e.g., less than 15 Newtons). In at least one embodiment, the insertion force may be very small (e.g., less than 6 Newtons). In at least one embodiment, the insertion force may be minimal (e.g., less than 2 Newtons). In at least one embodiment, the insertion force may be substantially zero (e.g., less than 1 Newton).

In embodiments where magnets 122 are used, the insertion force may be zero (e.g., no force applied by the user in the y-direction). For example, if the force applied by the magnet 122 in the y-direction is 16 Newtons (8 Newtons per magnet with two magnets) and the insertion force required by the user is 15 Newtons, the magnet 122 will actually pull the first portion 102 toward the second portion 104. In another example, where the first portion 102 and the second portion 104 are isolated such that the no forces are applied in the y-direction (e.g., the first portion 102 and the second portion 104 are placed in a mandrel) the magnetic force from the magnet 122 may pull the first portion 102 and the second portion 104 into the docked configuration before the locking protrusion 130 comes into contact with the locking receptacle 140. In other words, when the locking protrusion 130 is sufficiently close to the locking receptacle 140, the magnetic force of the magnet 122 may pull the locking protrusion 130 into the locking receptacle 140 without any other forces being needed.

In at least one embodiment described herein, the connection between a single locking protrusion 130 and a single locking mechanism 120 has a gap between the first portion 102 and the second portion 104 of less than 0.1 mm, is able to lock the first portion 102 to the second portion 104 while maintaining an electrical connection and allowing no more than 0.5 mm of motion under a tensile force of 28 Newtons, is capable of resisting a tensile force of 200 Newtons without separating the locking protrusion 130 from the locking receptacle 140, is capable of resisting a tensile force of 4 Newtons without moving more than 75 microns, has free play about $\theta_x$ of less than 0.1 degrees about the x-axis when a 200 N-mm torque is applied in the positive or negative $\theta_x$-direction, has free play in the y-direction of less than 18 microns when a 1 Newton tensile force is applied in the y-direction, has a required insertion force of less than 5 Newtons in the y-direction, while only two locking elements abut within a single locking receptacle 140.

In at least one embodiment described herein, the connection between a single locking protrusion 130 and a single locking mechanism 120 has a gap between the first portion 102 and the second portion 104 of less than 0.5 mm, is capable of resisting a tensile force of 100 Newtons without separating the locking protrusion 130 from the locking receptacle 140, is capable of resisting a tensile force of 2 Newtons without moving more than 75 microns, has free play about $\theta_x$ of less than 1.5 degrees about the x-axis when a 200 N-mm torque is applied in the $\theta_x$-direction, has free play in the y-direction of less than 500 microns when a 1 Newton tensile force is applied in the y-direction, has a required insertion force of less than 15 Newtons in the y-direction.

Although specific combinations of the various components of a secure connection (with or without specific insertion force values and/or specific numbers of locking components) are provided, any permutation of the various components of a secure connection (with or without specific insertion force values and/or specific numbers of locking components) are contemplated as being a part of the present disclosure. For example, at least one embodiment disclosed herein may only be capable of one of: having a gap between the first portion 102 and the second portion 104 of less than 0.5 mm, is capable of resisting a tensile force of 100 Newtons without separating the locking protrusion 130 from the locking receptacle 140, is capable of resisting a tensile force of 2 Newtons without moving more than 75 microns, resisting a tensile force of 28 Newtons without moving more than 0.5 mm, has free play about $\theta_x$ of less than 1.5 degrees about the $\theta_x$-axis when a 200 N-mm torque is applied in the $\theta_x$-direction, having free play in the y-direction of less than 500 microns when a 1 Newton tensile force is applied in the y-direction, having a required insertion force of less than 15 Newtons in the y-direction. In another example, at least one embodiment disclosed herein may only be capable of one of: having a gap between the first portion 102 and the second portion 104 of less than 0.1 mm, is capable of resisting a tensile force of 200 Newtons without separating the locking protrusion 130 from the locking receptacle 140, is capable of resisting a tensile force of 4 Newtons without moving more than 75 microns, resisting a tensile force of 56 Newtons without moving more than 0.5 mm, has free play about $\theta_x$ of less than 0.1 degrees about the $\theta_x$-axis when a 200 N-mm torque is applied in the $\theta_x$-direction, having free play in the y-direction of less than 75 microns when a 4 Newton tensile force is applied in the y-direction, having a required insertion force of less than 5 Newtons in the y-direction.

Thus, at least one embodiment described herein may meet only one of the disclosed ranges and/or values described herein for a secure connection while failing to meet the other disclosed ranges and/or values described herein (with or without specific insertion force values and/or specific numbers of locking components). At least one embodiment disclosed herein may meet two or more of the disclosed ranges and/or values described herein for a secure connection while failing to meet the other disclosed ranges and/or values described herein (with or without meeting specific insertion force values and/or specific numbers of locking components). Thus, every permutation of these values are considered a part of this disclosure.

Returning to the description of FIGS. 1 and 2, in other embodiments, computing components on the first portion 102 may be in electronic communication with computing components on the second portion 104 via a wireless connection. For example, the first portion 102 may include a wireless receiver (not shown) and the second portion 104 may include a wireless transmitter (not shown) (or vice versa). In another example, both the first portion 102 and the second portion 104 may include a wireless transmitter and a wireless receiver (e.g., wireless transceivers).

Referring now to FIG. 2, the computing device 100 may include one or more locking mechanisms 120. As illustrated in FIG. 2, the computing mechanism includes two locking mechanisms 120. In other embodiments, more or fewer locking mechanisms 120 may be used.

The one or more locking mechanisms 120, as illustrated, may include one or more locking receptacles 140 on the first portion 102 and one or more locking protrusions 130 on the second portion 104. In other embodiments, the first portion 102 and the second portion 104 may each include one or more locking protrusions 130 and corresponding one or more locking receptacles 140. In other words, the first portion 102 may include a first locking protrusion 130, a second locking receptacle 140, and a third locking protrusion 130 and the second portion 104 may include a first locking receptacle 140 corresponding to the first locking protrusion 130 on the first portion 102, a second locking protrusion 130 corresponding to the second locking receptacle 140 on the first portion, and a third locking receptacle 140 corresponding to the third locking protrusion 130 on the first portion. More and or fewer combinations of locking mechanisms 120 in either configuration (e.g., only locking protrusions 130 or locking receptacles 140 on each portion or combinations of locking protrusions 130 or locking receptacles 140 on each portion) may be used.

As described above, in some embodiments, the one or more locking mechanisms 120 may include one or more magnets 122. As shown, in FIG. 3-2 each locking mechanism 120 may include one or more magnets 122. In other embodiments, one magnet 122 may be used for more than one locking mechanism 120 and/or more than one magnet 122 may be used for each locking mechanism 120.

The locking protrusions 130, in the illustrated embodiment, may include a planar upper surface and a planar lower surface. The locking protrusions 130 may have rounded (e.g., chamfered) edges. Further description of an example embodiment of a locking mechanism may be found in connection with FIG. 5-3 below.

The apertures 141 of the locking receptacles 140 on the first portion 102 are shown as being rounded on their front (e.g., in the z-direction) edges. In other embodiments, the apertures 141 of the locking receptacles may be rounded on their bottom (e.g., in the negative z-direction) edges. In further embodiments, the aperture 141 locking receptacle 140 may have an elongate rectangular shape. However, in embodiments where the locking receptacle 140 has an elongate rectangular shape, the locking protrusion 130 may be more likely to become bound within the locking receptacle 140. For example, when a locking protrusion 130 does not have much space within its corresponding locking receptacle 140, any twist about the y- or x-axis may bind the locking protrusion 130 in the locking receptacle 140. In order to prevent binding, a user would need to pull toward the bottom without significant rotation. However, by providing a few degrees of twist about the y-axis, a user may have some rotation without binding the locking protrusion 130 within the locking receptacle 140. In embodiments where the convex surface is opposite the rotating lock (e.g., rotating lock 360), line contact with the rotating lock and the convex surface may be achieved.

Figures 1, 3:
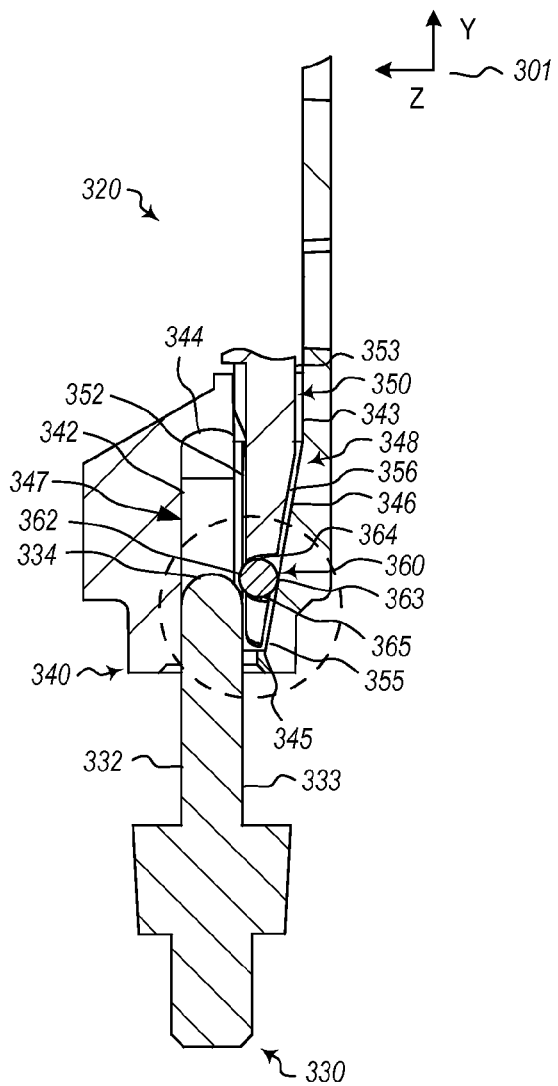
Figures 1, 3:
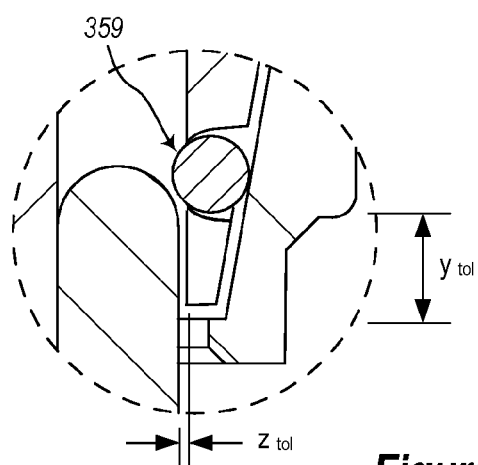
Figures 2, 3:
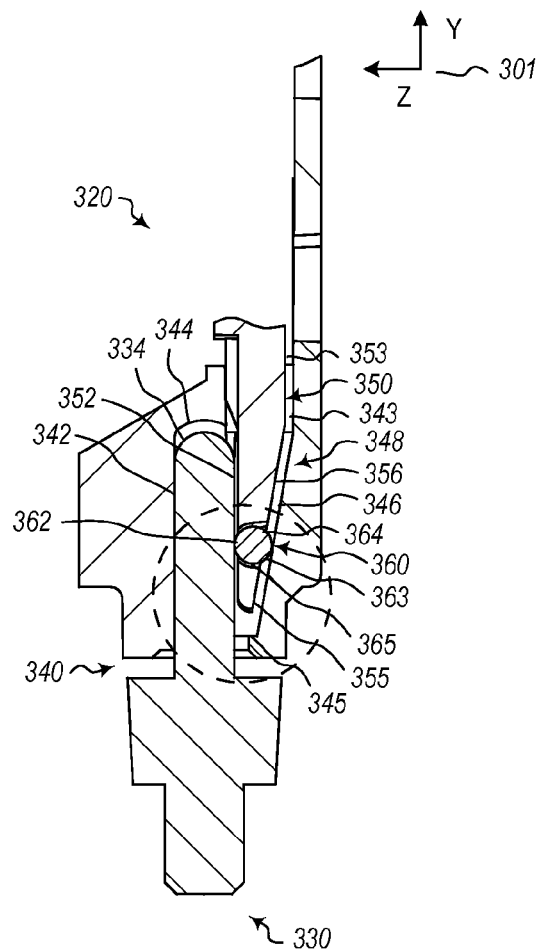
Figures 1, 2, 3:
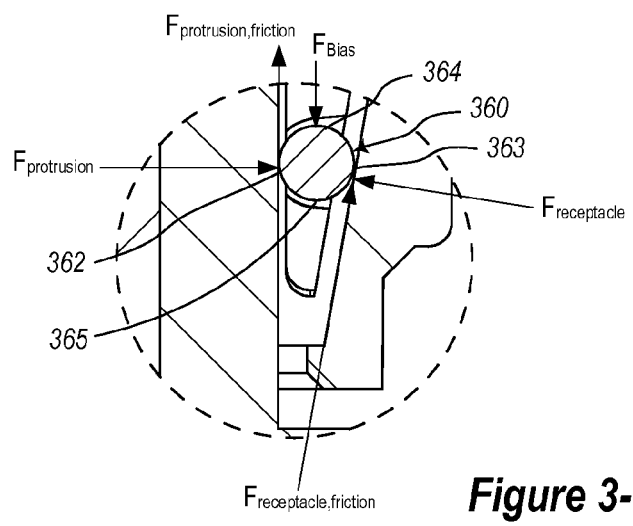
Figure 3:
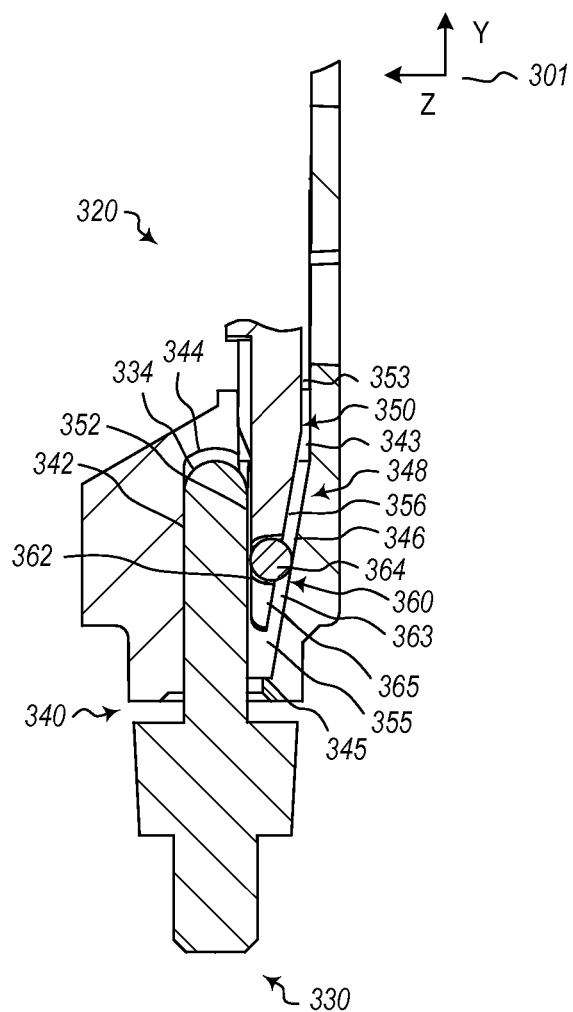

FIG. 3-1 is a cutaway side view of an embodiment of a locking mechanism 320 in an undocked configuration. FIG. 3-2 is a cutaway side view of the embodiment of a locking mechanism 320 in FIG. 3-1 in a locked configuration (e.g., docked and locked configuration). FIG. 3-3 is a cutaway side view of the embodiment of a locking mechanism 320 in FIG. 3-1 in an unlocked configuration (e.g., docked, but unlocked configuration). Referring generally to FIGS. 3-1, 3-2, and 3-3, the locking mechanism 320 may be used instead of or in addition to any locking mechanism described herein. The locking mechanism 320 may include a locking protrusion 330, a locking receptacle 340, and a rotating lock 360.

The locking mechanism 320 may include a carrier 350 that may include a front surface 352, a back surface 353, a top surface 354, a bottom surface 355, and a tapered surface 356. The carrier 350 may include a rotating lock aperture 359 that is configured to engage the rotating lock 360. The locking protrusion 330 may include a front surface 332, a back surface 333, and a top surface 334. The locking receptacle 340 may include a front surface 342, a back surface 343, a top surface 344, a bottom surface 345, a tapered surface 346, a locking protrusion portion 347 (e.g., the portion of the locking receptacle 340 into which the locking protrusion 330 may be inserted), and a carrier portion 348 (e.g., the portion of the locking receptacle 340 into which the carrier 350 may be inserted).

The locking protrusion portion 347 of the locking receptacle 340 may be sized and/or configured to receive the locking protrusion 330. The carrier portion 348 of the locking receptacle 340 may be sized and/or configured to receive the carrier 350. The front surface 342 of the locking receptacle 340 may be sized and oriented to abut the front surface 332 of the locking protrusion 330. The back surface 343 of the locking receptacle 340 may be sized and oriented to abut the back surface 353 and/or bottom surface 355 of the carrier 350. The top surface 344 of the locking receptacle 340 may be configured to abut the top surface 334 of the locking protrusion 330 in a locked configuration. The bottom surface 345 of the locking receptacle 340 may be configured to engage the bottom surface 355 of the carrier 350. The tapered surface 346 of the locking receptacle 340 may be configured to engage the tapered surface 356 of the carrier 350.

The tapered surface 346 of the locking receptacle 340 is angled relative to the back surface 343 of the locking receptacle 340. The angle may be determined by $2 \times \tan^{-2} \mu$, where $\mu$ is the coefficient of friction of the material of the tapered surface 346 of the locking receptacle 340. For example, the coefficient of friction, $\mu$, of steel is 0.1, thus the angle of the tapered surface 346 may be less than 11.4 degrees. The illustrated angle is ten degrees.

The rotating lock 360 may rotate about an axis. Examples of rotating locks include a sphere, a spheroid, a cylinder, a gimbal, a cam, other rotating locks, or combinations thereof. The rotating lock 360 may include a front surface 362, a back surface 363, a top surface 364, and a bottom surface 365. Although described in terms of front and back surfaces 362, 363, as the rotating lock 360 rotates the front surface 362 may no longer be the "front". In other words, as the front surface 362 rotates one-hundred and eighty degrees, the front surface 362 is now in the same rotational position as the back surface 363 before rotation began. Thus, for ease of description, the front surface 362 is the portion of the outer surface of the rotating lock 360 that is closest to the back surface 333 of the locking protrusion 330, the back surface 363 is the portion of the outer surface of the rotating lock 360 that is closest to the back surface 343 of the locking receptacle 340, the top surface 364 is the portion of the outer surface of the rotating lock 360 that is closest to the top (e.g., in the y-direction) of the locking mechanism 320, and the bottom surface 365 is the portion of the outer surface of the rotating lock 360 that is closest to the bottom (e.g., in the negative y-direction) of the locking mechanism 320.

In the undocked configuration shown in FIG. 3-1, the locking protrusion 330 has not yet been inserted into the locking protrusion portion 347 of the locking receptacle 340. In this undocked configuration, at least a portion of the carrier 350 may be inserted into the carrier portion 348 of the locking receptacle 340. The carrier 350 may be biased toward the bottom surface 345 and into the carrier portion 348 of the locking receptacle 340 by, for example, a spring.

In some embodiments, the carrier 350, may abut a stop surface. The locking receptacle 340 may include a stop surface that limits movement of the carrier 350 toward the bottom of the locking mechanism 320. For example, a portion of the carrier 350 may abut a top facing (e.g., in the y-direction) surface of the locking receptacle 340. When the carrier 350 abuts a top facing surface (e.g., the top surface 344, the bottom surface 345, the tapered surface 346, or combinations thereof of the locking receptacle 340), the carrier 350 may be in its bottom-most position. When the carrier 350 is in its bottom-most position, the rotating lock 360 may be in its top-most (e.g., in the y-direction) and front-most (e.g., in the z-direction) position, as well.

The front surface 362 of the rotating lock 360 may extend at least partially into the locking protrusion portion 347 of the locking receptacle 340 in the undocked configuration. As can be seen in FIG. 3-1, the front surface 362 of the rotating lock 360 extends forward (e.g., in the z-direction) beyond a plane (not shown) of the back surface 333 of the locking protrusion 330. Thus, as the locking protrusion 330 is inserted into the locking receptacle 340, the top surface 334 of the locking protrusion 330 may contact the rotating lock 360 (e.g., the front surface 362 and/or the bottom surface 365 of the rotating lock 360).

The tapered surface 346 of the locking receptacle 340 may abut the bottom surface 365 of the rotating lock 360. The tapered surface 346 may be substantially planar (e.g., flat), such that the rotating lock 360 may rotate (e.g., roll) between the bottom surface 345 and the back surface 343 of the locking receptacle 340.

In embodiments where a rotating lock 360 is used, the rotating lock 360 may act as a tolerance capacitor. In other words, the rotating lock 360 may allow a relaxation of tolerance requirements for other components of the locking mechanism. In other words, the rotating lock 360, as shown in FIG. 3-1-1, may have a tolerance capacity in the z-direction and a tolerance capacity in the y-direction. For example, in the z-direction, the thickness from the front surface 332 to the back surface 333 of the locking protrusion 330 may have a nominal value and a tolerance, the width in the z-direction of the locking protrusion portion 347 of the locking receptacle 340 may have a nominal value and a tolerance, the maximum width (e.g., at the bottom of the tapered surface 356) of the carrier 350 may have a nominal value and a tolerance, the maximum width (e.g., at the bottom of the tapered surface 346) of the carrier portion 348 of the locking receptacle 340 may have a nominal value and a tolerance, the minimum width (e.g., at the top of the tapered surface 356) of the carrier 350 may have a nominal value and a tolerance, the minimum width (e.g., at the top of the tapered surface 346) of the carrier portion 348 of the locking receptacle 340 may have a nominal value and a tolerance, and the diameter of the rotating lock 360 may have a nominal value and a tolerance. However, one or more of the tolerance values may be reduced due to the tolerance capacity in the z-direction provided by the rotating lock 360.

In another example, the tolerances of the locking protrusion 330, the locking receptacle 340, and the rotating lock 360 in the z-direction may determine the locked position (e.g., the position where front surface 362 of the rotating lock 360 first abuts the back surface 333 of the locking protrusion 330) of the rotating lock 360 in the y-direction. Thus, the locked position of the rotating lock 360 may be independent of its position in the y-direction and/or of the y-tolerances and/or z-tolerances to the extent that the rotating lock 360 is able to move in the positive and negative y-direction. In the illustrated embodiment, the rotating lock 360 may move plus or minus 0.5 mm, which soaks up about plus or minus 0.16 mm of tolerances from the locking protrusion 330, the locking receptacle 340, and the rotating lock 360 in the z-direction.

In some embodiments, the tolerances of these various dimensions may be very small in order to prevent binding of the locking components within the locking receptacle 340. However, the rotating lock 360 may allow a relaxation (e.g., an increase in) at least one of the various tolerances. This is due to the fact that the only requirement for the rotating lock 360 to lock the locking protrusion 330 in the locking receptacle 340 is for the rotating lock 360 to be properly seated (e.g., be positioned at least partially into the locking protrusion portion 347 of the locking receptacle 340) such that the front surface 362 of the rotating lock 360 abuts the back surface 333 of the locking protrusion 330.

For example, for an embodiment where the thickness from the front surface 332 to the back surface 333 of the locking protrusion 330 is nominally 1.5 mm with a tolerance of plus or minus 25 microns, the width in the z-direction of the locking protrusion portion 347 of the locking receptacle 340 at the nominal position of the rotating lock 360 is nominally 2.5 mm with a tolerance of plus or minus 65 microns, and the diameter of the rotating lock 360 is nominally 1.0 mm with a tolerance of plus 8 microns or minus 5 microns, the tolerance capacity of the rotating lock 360 in the z-direction may be plus or minus 300 microns. In other words, one or more of the tolerances may be increased by a portion of the tolerance capacity of the rotating lock 360 in the z-direction. In embodiments with a rotating lock 360, all of the tolerances in the z-direction of the locking protrusion 330, the locking receptacle 340, and the rotating lock 360 may be converted into uncertainty of the roller position. In other words, if all the locking components are at their extreme positions, the rotating lock 360 may be at its extreme position. In embodiments where the thickness of the computing device (e.g., computing device 100) is limited, the tolerances in the thickness direction (e.g., the z-direction) may be very small. However, if the computing device has space in other directions (e.g., the y-direction), the rotating lock 360 may soak up the tolerances in the thickness direction and convert them into position uncertainty for the rotating lock 360.

As the locking mechanism 320 transitions from the undocked configuration shown in FIG. 3-1 to the docked configuration shown in FIG. 3-2, the rotating lock 360 moves toward the top (e.g., in the y-direction) of the locking mechanism 320. For example, as the locking protrusion 330 is inserted into the locking receptacle 340, the top surface 334 of the locking protrusion 330 may abut and move the rotating lock 360 toward the top of the locking mechanism 320. As the rotating lock 360 is pushed toward the top of the locking mechanism 320, the rotating lock 360 moves both toward the top (e.g., in the y-direction) and toward the back (e.g., in the negative z-direction) of the locking mechanism 320. As the bottom surface 365 of the rotating lock 360 transitions from contact with the top surface 334 of the locking protrusion 330, the top surface 364 of the rotating lock 360 comes into contact with the back surface 333 of the locking protrusion 330.

In embodiments where the rotating lock 360 is biased toward the bottom surface 345 of the locking protrusion, the forces being applied to the rotating lock 360 are illustrated in FIG. 3-2-1. The biasing force (e.g., a force applied by a biasing mechanism such as a spring) is applied to the top surface 364, which results in the force applied by the locking receptacle 340 (e.g., normal to the tapered surface 346) on the bottom surface 365 of the rotating lock 360 and the force applied by the locking protrusion 330 (e.g., normal to the back surface 333) on the front surface 362 of the rotating lock 360 (ignoring the force of gravity) as well as the force due to the friction (e.g., $\mu*F_{Receptacle}$) of the locking receptacle 340 and the force due to friction (e.g., $\mu*F_{Protrusion}$) of the locking protrusion 330. In other embodiments, the forces applied to the rotating lock may differ. For example, instead of a biasing force, gravity may be used to move the rotating lock 360 toward the bottom of the locking mechanism 320.

In the undocked configuration shown in FIG. 3-1, the rotating lock 360 may be housed by the rotating lock aperture 359 of the carrier 350. The rotating lock aperture 359 may couple movement of the rotating lock 360 with the carrier 350 in at least one direction. For example, as shown in FIG. 3-1, the rotating lock aperture 359 may couple movement of the rotating lock 360 in the top and bottom (e.g., in the y-direction) directions. As shown, the rotating lock aperture 359 may limit movement in the front and back (e.g., in the z-direction) direction of the rotating lock 360. For example, the rotating lock aperture 359 may be shaped to correspond with at least a portion of the shape of the rotating lock 360. As shown, an inner surface of the rotating lock aperture 359 may be curved internally in a front portion and/or a back portion to correspond with an outer surface of the rotating lock 360. In embodiments where the front surface 352 of the carrier 350 abuts with a back facing surface in the carrier portion 348 of the locking receptacle, the front surface 352 of the carrier 350 may combine with the rotating lock aperture 359 to limit movement in the front and back direction of the rotating lock 360.

In embodiments without a carrier 350, the rotating lock 360 may abut a back facing surface in the carrier portion 348 to allow only a portion of the rotating lock 360 to enter the locking protrusion portion 347 of the locking receptacle 340. For example, the rotating lock 360 may be shaped such that a left and/or right portion of the rotating lock 360 has a smaller dimension in the front and back direction than a middle portion (e.g., between the left and right portions) of the rotating lock 360, such that the middle portion still extends, at least partially, into the locking protrusion portion 347 of the locking receptacle 340 when another portion (e.g., the left and/or right portion) is prevented from doing so.

The top surface 334 of the locking protrusion 330 and the top surface 344 of the locking receptacle 340 are illustrated with complementary rounded, convex faces. In other embodiments, the top surface 334 of the locking protrusion 330 and/or the top surface 344 of the locking protrusion may be otherwise shaped (e.g., complementary, not complementary, rounded, not rounded, convex, concave, or combinations thereof).

To transition from the locked configuration shown in FIG. 3-2, a force must be applied to the carrier 350 to retract the rotating lock 360. As the carrier 350 is transitioned from the locked configuration toward the unlocked configuration, the tapered surface 356 of the carrier 350 may cease to contact the tapered surface 346 of the locking receptacle 340. In the illustrated embodiment, at least the portion of the carrier 350 that fits into the carrier portion 348 of the locking receptacle 340 may be rigid. In other embodiments, at least a portion of the carrier 350 may be elastically deformable such that when the tapered surface 356 of the carrier 350 initially contacts the tapered surface 346 of the locking receptacle, the carrier 350 elastically deforms (e.g., bends) as the carrier 350 advances and returns toward its initial state as the carrier 350 is retracted. Thus, the tapered surface 356 of the carrier 350 may remain in contact with the tapered surface 346 of the locking receptacle 340 as the carrier 350 is retracted.

Once the rotating lock 360 no longer contacts the back surface 333 of the locking protrusion 330, the locking protrusion 330 may be removed. In some embodiments, the first portion 102 and the second portion 104 may stay together in the unlocked configuration. In other embodiments, the locking mechanism 120 may return to the locked/docked configuration of FIG. 3-2 after a predetermined period of time.

Figures 1, 4:
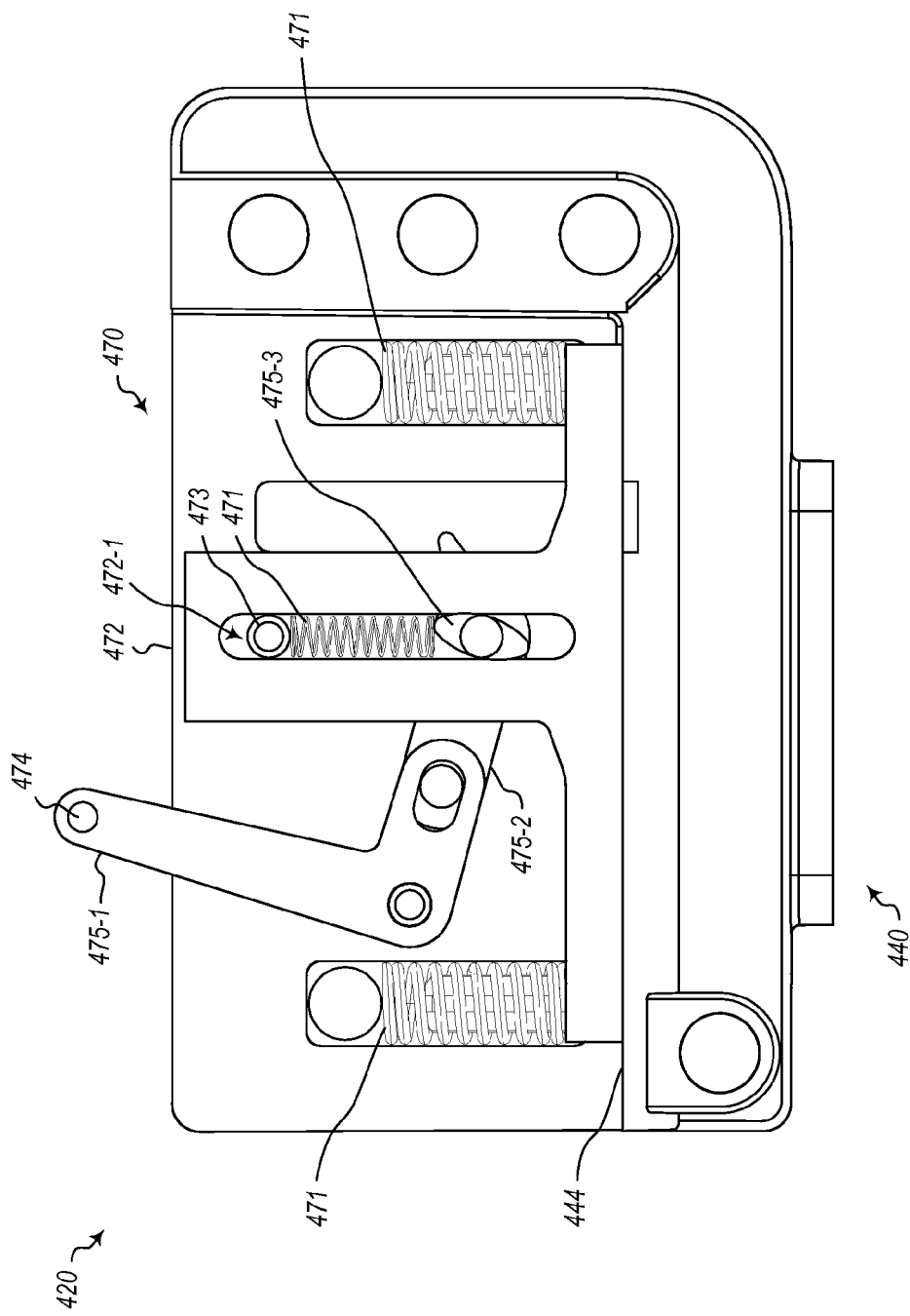
Figures 2, 4:
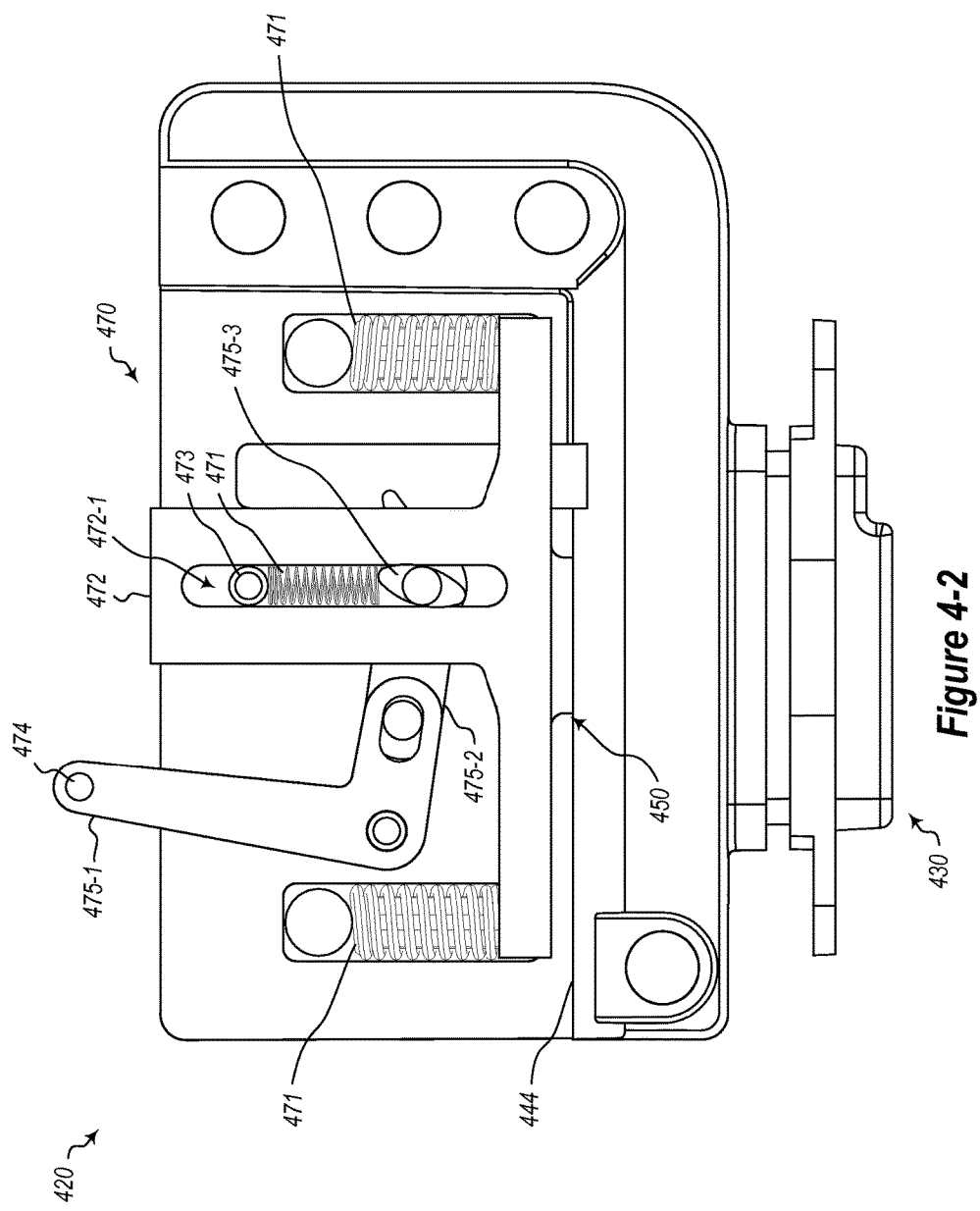
Figures 3, 4:
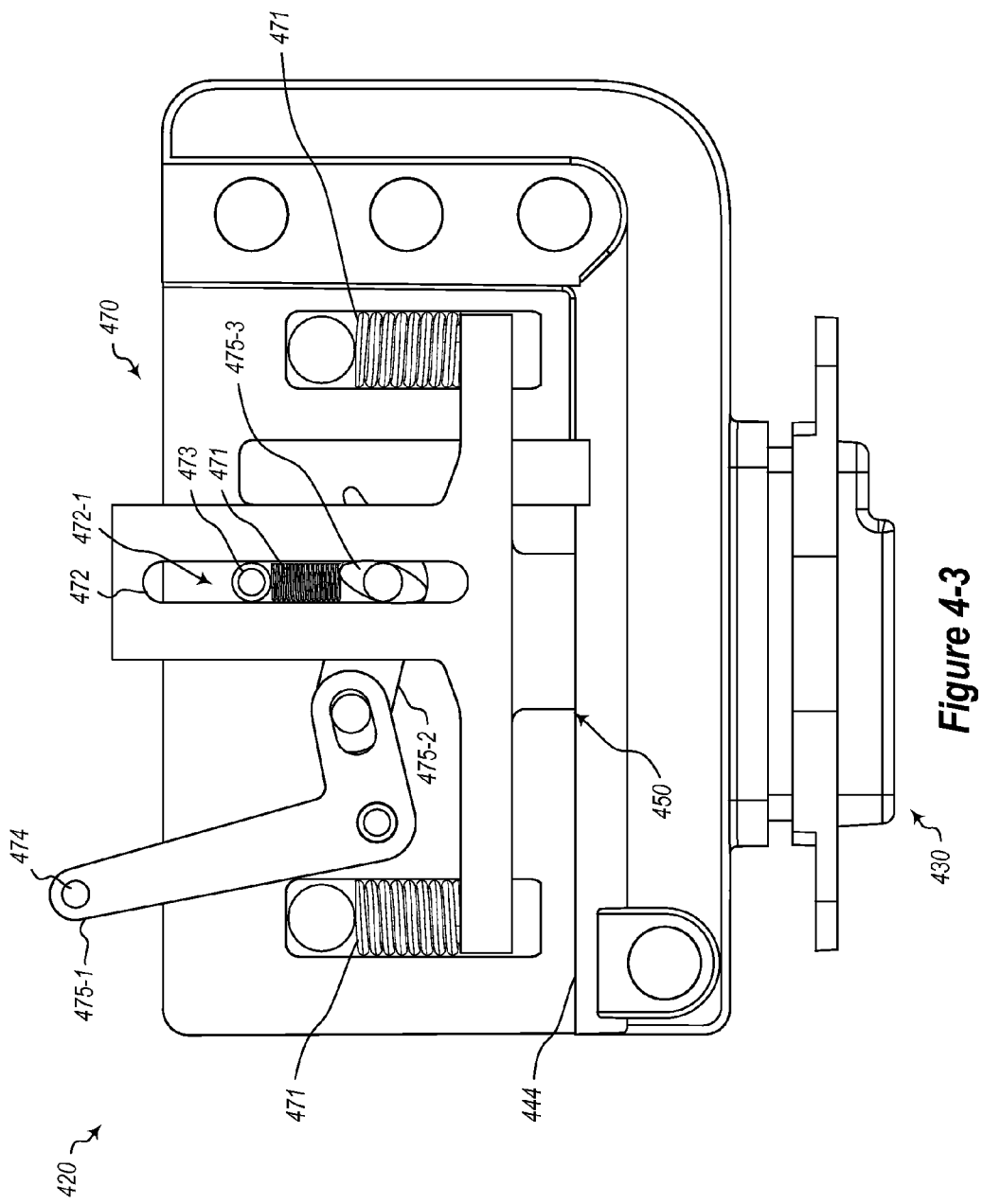

FIG. 4-1 is a front view of another embodiment of a locking mechanism 420 shown in an undocked configuration. FIG. 4-2 is a front view of the embodiment of a locking mechanism 420 of FIG. 4-1 shown in a locked configuration. FIG. 4-3 is a front view of the embodiment of a locking mechanism 420 of FIG. 4-1 shown in an unlocked configuration. The locking mechanism 420 may be similar to the locking mechanisms (e.g., locking mechanisms 120, 320) described herein. For example, the locking mechanism 420 includes a locking protrusion 430 (shown in FIG. 4-2), a locking receptacle 440, and a carrier 450 (shown in FIGS. 4-2 and 4-3). The locking mechanism 420 may include a rotating lock 460 and/or another lock, such as the other locks described herein. The locking mechanism 420 includes an actuator 470. The actuator 470 may be used with any locking mechanism described herein to unlock a first portion (e.g., first portion 102) from a second portion (e.g., second portion 104).

As shown in FIG. 4-2, the actuator 470 may be directly connected to the carrier 450. For example, the actuator 470 may be integrally formed with the carrier 450.

The actuator 470 may include one or more biasing mechanisms. As illustrated, the biasing mechanisms may include coil springs 471. The biasing mechanisms may include any type of mechanical energy storage device in compression or tension such as a coil spring, a torsion spring, a leaf spring, an air spring, foam, a balloon, other mechanical energy storage devices, or combinations thereof. The biasing mechanisms bias the actuator 470 toward the bottom of the locking mechanism 420. The biasing mechanism may bias the locking mechanism 420 (e.g., including a rotating lock 360 or another lock) into the undocked and/or locked configuration.

The actuator 470 may include a slider 472. The slider 472 may slide about a pin 473 and the carrier 450 may be slide within the locking receptacle 440. Thus, the slider 472 may slide toward the top and the bottom of the locking mechanism 420. The actuator 470 may be limited in its range of motion by a stop surface. For example, a top surface 444 of the locking receptacle 440 may prevent the actuator 470 from moving beyond the top surface 444.

The actuator 470 may include a connector 474. The connector 474 may connect with an actuation input such as a mechanical slide, a latch, an electrical actuator, other actuation inputs, or combinations thereof. For example, a mechanical slide (not shown) may be connected to the connector 474 such that when the mechanical slide is manually moved from, for example, right to left, the connector 474 moves as well.

The locking mechanism 420 may include a slip clutch 475. The slip clutch 475 may include a lever 475-1 that is connected to a clutch lever 475-2 by a pin (not labeled). The lever 475-1 may pivot about a pin 473. The clutch lever may include a cam 475-3. As illustrated, the connector 474 is connected to the slip clutch 475. In other embodiments, the connector 474 may be connected to the slider 472. In further embodiments, the connector 474 may be connected to another component of the locking mechanism 420.

The cam 475-3 may ride within a slot 472-1 of the slider 472. The cam 475-3 may be oblong shaped and sized so that its major dimension is smaller than the width of the slot 472-1. The oblong shape allows the cam 475-3 to slide within the slot 472-1. The cam 475-3 may be biased within the slot 472-1. For example, a spring 471 may bias the cam 475-3 toward the bottom of the slot 472-1. Biasing the cam 475-3 within the slot may engage the oblong surface of the cam 475-3 against the slot.

At least one embodiment of the slip clutch 475 may maintain tension on the locking mechanism 420 such that when the connector 474 is moved, the carrier 450 moves. In embodiments without a slip clutch 475, movement of the carrier 450 in response to movement of the connector 474 may not be immediate. For example, due to variations in dimensions of components of the locking mechanism 420, the locking mechanism 420 may bind (e.g., get stuck during its usual motion). The slip clutch 475 may adjust for the variations in tolerances for the components of the locking mechanism 420.

As the locking mechanism 420 moves from the unlocked configuration of FIG. 4-1 to the locked configuration of FIG. 4-2, the locking protrusion 430 is inserted into the locking receptacle 440. The carrier 450 may move toward the top of the locking mechanism 420. For example, if the locking mechanism 420 uses a rotating lock (e.g., the rotating lock 360), the locking protrusion 430 may move the rotating lock toward the top of the locking mechanism 420, thus moving the carrier 450 toward the top. The cam 475-3 of the slip clutch 475 may move within the slot 472-1 which may move the lever 475-1 (away from the cam 475-3 in the illustrated embodiment).

As the locking mechanism 420 moves from the locked configuration of FIG. 4-2 to the unlocked configuration of FIG. 4-3, the lever 475-1 may move about the pin 473 away from its position in the undocked configuration (e.g., toward the left, as shown). The lever 475-1 may move the clutch lever 475-2 (e.g., toward the left, as shown), which may engage the cam 475-3 against the slot 472-1 to apply an upward force to the slot 472-1 to move the carrier 450 toward the unlocked configuration.

Figures 1, 3, 5:
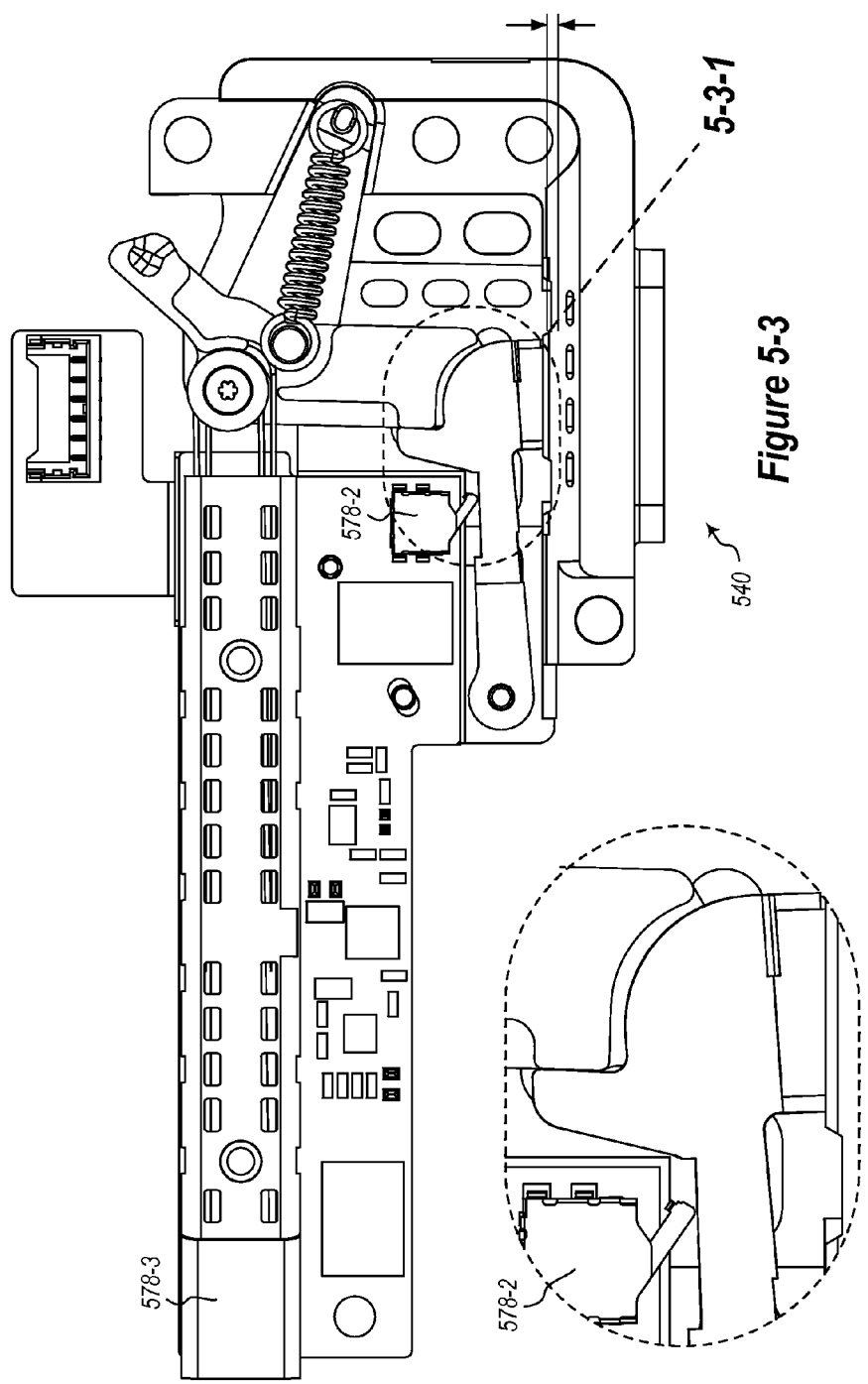

FIG. 5-1 is a front view of a further embodiment of a locking mechanism 520 shown in an undocked configuration. FIG. 5-2 is a front view of the embodiment of a locking mechanism 520 of FIG. 5-1 shown in a locked configuration. FIG. 5-3 is a front view of the embodiment of a locking mechanism 520 of FIG. 5-1 shown in an unlocked configuration. The locking mechanism 520 may be similar to the locking mechanisms (e.g., locking mechanisms 120, 320, 420) described herein. For example, the locking mechanism 520 includes a locking protrusion 530 (shown in FIG. 5-2), a locking receptacle 540, and a carrier 550 (shown in FIGS. 5-2 and 5-3). The locking mechanism 520 may include a rotating lock (such as a rotating lock 360 shown in FIG. 3-1) and/or another lock, such as the other locks described herein. The locking mechanism 520 includes an actuator 570. The actuator 570 may be used with any locking mechanism described herein to unlock a first portion (e.g., first portion 102) from a second portion (e.g., second portion 104).

Referring briefly back to both FIG. 2 and FIG. 5-3, the locking protrusion 530 may include a planar front surface 530-2, a planar bottom surface 530-3, and a planar top surface 530-4, a planar left surface 530-5, and a planar right surface 530-6. The planar front surface 530-2 may be parallel to the planar bottom surface 530-3. The top surface 530-4 may be orthogonal to the planar front surface 530-2 and/or the planar bottom surface 530-3. As best seen in FIG. 2 the edges of the locking protrusion 130 may be rounded between the top surface (e.g., top surface 530-4 shown in FIG. 5-3) and the left surface (e.g., left surface 530-5 shown in FIG. 5-3) and/or the right surface (e.g., right surface 530-6 shown in FIG. 5-3). Rounded edges may facilitate removal of the locking protrusion 530 from the locking receptacle 540. For example, without rounded edges (e.g., with straight edges) pulling the top corner of the first portion (e.g., first portion 102) and the top corner of the second portion (e.g., second portion 104) may bind the locking protrusion 530 within the locking receptacle. For example, the top-left edge of the locking protrusion 530 may abut the left surface (not shown) of the locking receptacle 540. By rounding the edges, the two portions 102, 104 may separate without binding.

The rotating lock aperture 559 is shown as a cylinder with enlarged ends. A cylindrical rotating lock may rotate regardless of orientation. For example, the rotating lock 560 is shown parallel to the x-axis (e.g., parallel to a top edge of the locking protrusion 530). However, the rotating lock 560 may be oriented nonparallel to the x-axis and still securely lock the locking protrusion 530. For example, as the lever arm 576 rotates the carrier 550, the angle of the rotating lock aperture 559 may change. In another example, the locking protrusion 530 may be inserted at an angle about $\theta_y$ changing the angle at which the rotating lock 560 engages the locking protrusion 530. For a straight cylinder shaped rotating lock aperture 559, this may prevent line contact with the locking receptacle 530 by forcing the rotating lock 560 out of position. In embodiments with a rotating lock aperture 559 that is cylindrical with enlarged ends, the rotating lock 560 may maintain line contact at an angle of greater than three degrees, greater than five degree, greater than 10 degrees sufficient to create a secure lock. The rotating lock 560 may be on the opposite side of the locking receptacle 540 as the rounded edge of the aperture (e.g., aperture 141 shown in FIG. 2) of the locking mechanism 540.

The locking mechanism 520 may include an electronic actuator. The electronic actuator may be a shape memory alloy (SMA) wire 578. In some embodiments, such as the illustrated embodiment, the locking mechanism 520 may include a single wire 578. In other embodiments, multiple wires 578 may be used. Although shown with an electronic actuator 570, the actuator 570 may use other actuation inputs, such as a mechanical slide, a latch, other actuation inputs, or combinations thereof.

As shown in FIG. 5-1, the actuator 570 may include a lever arm 576 that may be directly connected to the carrier 550. For example, the carrier 550 may be integrally formed with the lever arm 576. The lever arm 576 may rotate about a pin 573 (shown on the left of FIG. 5-1). The lever arm 576 may be connected to a rocker arm 577 via a pin 573 (shown in phantom in FIG. 5-1-1).

The rocker arm 577 may be connected to the actuator 570 by a connector 574. A first end of the SMA wire 578 may be connected by a clip 578-1 to the locking mechanism 520 and a second end of the SMA wire 578 may be connected to the connector 574. The clip 578-1 may be configured to receive current from a power source (e.g., battery 114) to heat the SMA wire 578. The SMA wire 578 may transition between an undocked state (shown in FIG. 5-1), a locked state (shown in FIG. 5-2), and an unlocked state (shown in FIG. 5-3). As shown, the SMA wire 578 is fully extended in the undocked and the locked states and is fully retracted in the unlocked state.

The SMA wire 578 may be in a martensite state in the undocked and locked configurations and in an austenite state in the unlocked configuration. When the SMA wire 578 is heated above its transition temperature (e.g., above 90° C. for nickel-titanium), the SMA wire 578 may transition to the austenite state causing a decrease in length (by about 3% for nickel-titanium). For example, for a single wire 578 connected at one end to the locking mechanism 520 and at the other end to the connector 574, the SMA wire 578 may decrease in length (i.e., pull the first end of the SMA wire 578 toward the second end of the SMA wire 578). For a nickel-titanium SMA wire, the decrease in length, and thus, corresponding movement of the connector 574 is 4.5 mm (for a single wire) and 2.25 mm (for a looped wire). When the SMA wire 578 drops below its transition temperature, the SMA wire 578 may transition back to the martensite state returning to its original length (or substantially to its original length). For a nickel-titanium SMA wire the wire increases in length by 4.5 mm (for a single wire) and 2.25 mm (for a looped wire).

The connector 574 may include a pulley about which the SMA wire 578 may be wrapped. For example, two clips 578-1 may be secured to each end of the single SMA wire 578 and a portion of the wire (e.g., the middle) may be wrapped around the connector 574. When the SMA wire 578 is heated above its transition temperature, the SMA wire 578 may transition to the austenite state causing a decrease in length (by about 3% for nickel-titanium), but as the wire is wrapped around the connector 574, the distance between the two ends of the SMA wire 578 and the connector 574 is decreased by double the distance of an SMA wire that is connected at one end to the locking mechanism 520 and at the other end to the connector 574. Likewise, when the SMA wire 578 drops below its transition temperature, the SMA wire 578 may transition back to the martensite state returning to its original length (or substantially to its original length), thus effectively moving twice the distance back to its original length compared to a non-wrapped SMA wire 578.

The rocker arm 577 may include a biasing mechanism (e.g., one or more springs 571). The rocker arm 577 may be biased toward the bottom of the locking mechanism 520 (e.g., toward the locking receptacle 540) and/or toward the opposite end(s) (e.g., the end away from the connector 574) of the SMA wire 578. Thus, when the SMA wire 578 cools below its transition temperature, the biasing mechanism guides the connector 574 back toward its original position (e.g., from the left toward the right).

In some embodiments, biasing the rocker arm 577 toward the bottom of the locking mechanism 520 and toward the opposite end(s) of the SMA wire 578 may be accomplished by a single biasing mechanism (e.g., with a single spring 571, as illustrated). In other embodiments, biasing may be accomplished by one or more biasing mechanisms.

The biasing force pulling on the connector 574 to tension the SMA wire 578 (e.g., $F_{wire}$) may be larger than the biasing force pulling on the connector 574 to bias the carrier 550 into the locking receptacle 540 (e.g., $F_{lock}$). Thus, the angle of the spring $\theta_{spring}$ relative to the direction of the wire (e.g., the direction of the biasing force $F_{wire}$) may be selected to both tension the SMA wire 578 and to bias the carrier 550 into the locking receptacle 540. The biasing force ($F_{wire}$) to tension the SMA wire 578 may be between 7.5 and 15 Newtons. The biasing force ($F_{lock}$) to bias the carrier 550 into the locking receptacle 540 may be between 1.3 and 2.6 Newtons. In the present embodiment, the angle of the spring $\theta_{spring}$ relative to the direction of the wire is about ten degrees.

The lever arm 576 may include a rocker arm stop surface 576-1 and the rocker arm 577 may include a lever arm stop surface 577-1, best seen in FIG. 5-1-1. The lever arm stop surface 577-1 may abut (i.e., may be in direct contact with) the rocker arm stop surface 576-1 in the undocked configuration of FIG. 5-1 (and FIG. 5-1-1). As illustrated, the lever arm stop surface 577-1 may be flat and parallel to the flat rocker arm stop surface 576-1 with both surfaces abutting. In the locked configuration of FIG. 5-2 (and FIG. 5-2-1) and the unlocked configuration of FIG. 5-3, the lever arm stop surface 577-1 and the flat rocker arm stop surface 576-1 may be spaced apart by a gap. In some embodiments, the gap may be less than 0.2 mm. In other embodiments, the gap may be less than 0.5 mm.

The carrier 550 may abut the locking receptacle 540 in the undocked configuration. For example, the biasing mechanism may bias the carrier 550 against the locking receptacle 540. For example, as shown, a top surface 554 of the carrier 550 may abut a top surface 544 of the locking receptacle 540. In addition or alternatively, a bottom surface of the carrier 550 may abut a bottom surface of the locking receptacle 540.

As the locking mechanism 520 moves from the unlocked configuration of FIG. 5-1 to the locked configuration of FIG. 5-2, the locking protrusion 530 is inserted into the locking receptacle 540. The carrier 550 may move toward the top of the locking mechanism 520. For example, if the locking mechanism 520 uses a rotating lock (e.g., the rotating lock 360), the locking protrusion 530 may move the rotating lock toward the top of the locking mechanism 520, thus moving the carrier 550 toward the top. The lever arm 576 may rotate upward (e.g., toward the top of the locking mechanism 520) about its pin 573.

The abutting contact between the top surface 554 of the carrier 550 and the top surface 544 of the locking receptacle 540 may be broken and a distance between these surfaces may increase. For example, in at least one embodiment, the distance between the top surface 554 of the carrier 550 and the top surface 544 of the locking receptacle 540 is may be less than 1 mm. As seen in FIG. 5-2-1, the abutting contact between the lever arm stop surface 577-1 and the rocker arm stop surface 576-1 may be broken such that the lever arm stop surface 577-1 and the rocker arm stop surface 576-1 are separated by a distance.

Because the lever arm 576 is connected to the rocker arm 577, the movement of the lever arm 576 is coupled to the movement of the rocker arm 577. Thus, the rocker arm 577 moves toward the top of the locking mechanism 520.

Likewise, as the SMA wire 578 is connected to the rocker arm 577 via the connector 574, the SMA wire 578 also moves toward the top of the locking mechanism 520 (as shown in FIG. 5-2) applying further tension in the biasing mechanism in the direction of the locking receptacle 540 and thus increasing the force applied ($F_{lock}$) by the biasing mechanism. This may ensure that the lock (e.g., rotating lock 360) remains engaged with the locking protrusion 530.

As the locking mechanism 520 moves from the locked configuration of FIG. 5-2 to the unlocked configuration of FIG. 5-3, the SMA wire 578 may be heated above its transition temperature (e.g., above 90° C.) to reduce the length of the SMA wire 578 and pull the connector 574 toward the opposite end of the SMA wire 578. As the rocker arm 577 is pinned to the lever arm 576, the lever arm stop surface 577-1 and the rocker arm stop surface 576-1 abut and the force applied to the connector 574 causes the lever arm 576 to rotate toward the connector 574. Rotation of the lever arm 576 causes the carrier 550 to retract from the locking receptacle 540, thereby unlocking the locking protrusion 530. The locking mechanism 520 may remain in the unlocked configuration as long as the SMA wire 578 is heated above its transition temperature. When the SMA wire 578 cools below the transition temperature, the SMA wire 578 begins to elongate and the biasing mechanism moves the rocker arm 577 toward the locking receptacle 540, thereby moving the lever arm 576 and the carrier 550 back into the locking receptacle 540.

In some embodiments, the temperature of the SMA wire 578 may be controlled by a processor (e.g., processor 112). For example, no power may be applied to the SMA wire 578 until the processor receives an instruction to apply power to the SMA wire 578. An instruction to apply power may be given based on a user interacting with an input device (e.g., input device 111). A cover 578-3 may be used to protect other components from heat generated by the SMA wire 578.

Figure 11:
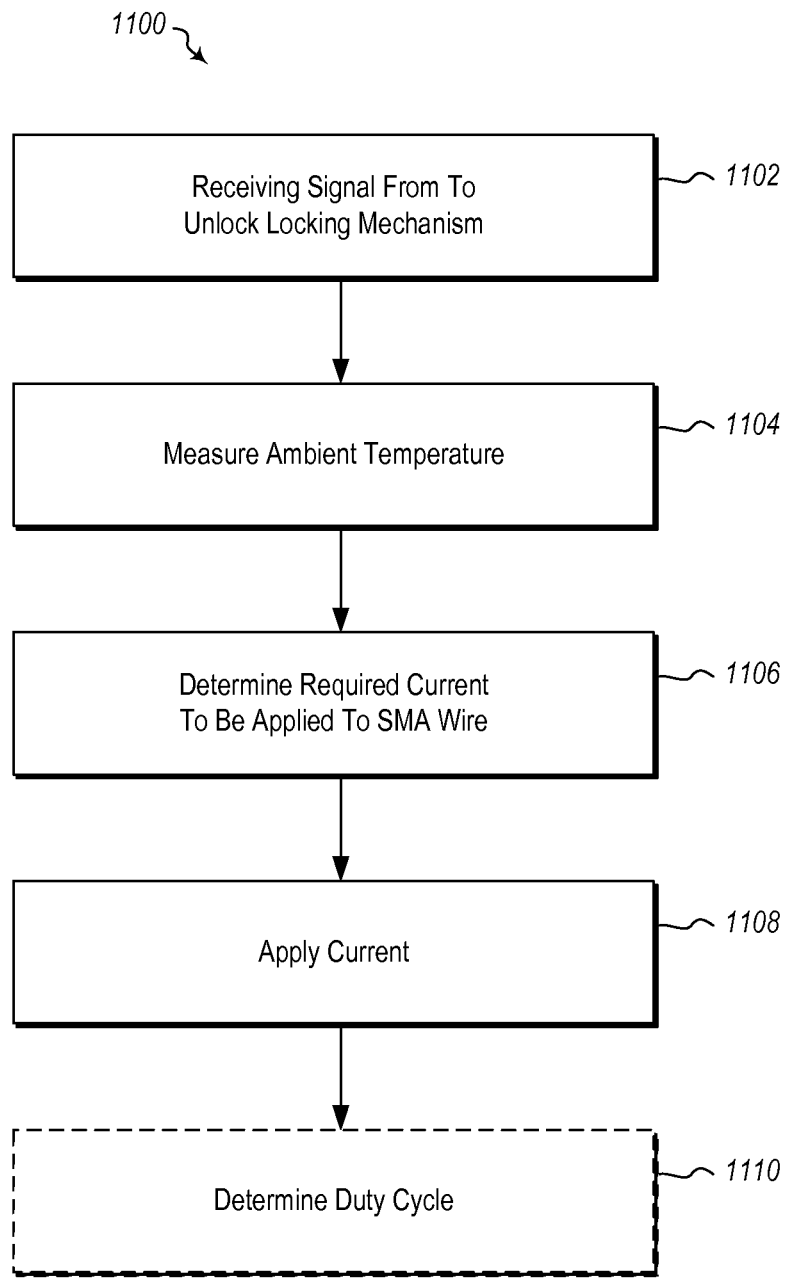
FIG. 11 is a flow diagram of a method for actuating a locking mechanism.

Referring to FIG. 11, a flow diagram of a method 1100 for actuating a locking mechanism, the method 1100 may include the act of receiving 1102 a signal from a user to unlock the locking mechanism. Once the signal is received 1102, a processor may instruct an electronic actuator to unlock the locking mechanism by applying 1108 current. For example, the processor may instruct the electronic actuator to apply current to a SMA wire (e.g., SMA wire 578). In some embodiments, it may be less desirable to apply too much or too little current to the SMA wire. For example, the current to be applied to the SMA wire may be determined based at room temperature. However, if ambient temperature is too high, the wire may be damaged by overheating the wire. If the ambient temperature is too low, the wire may not contract sufficiently to unlock the locking mechanism. In order to prevent over or under-heating the wire, the ambient temperature may be measured 1104 (e.g., by thermistor 578-4 shown in FIG. 5-1). The required current to be applied to the SMA wire (e.g., SMA wire 578) may be determined 1106 based on the determined ambient temperature. For example, the current to be applied based on the determined ambient temperature in a system using 5 V may be I=−0.0135*Ambient Temperature (° C.)+2.1417. The determined current may be applied 1108.

In embodiments where the current is controlled by a digital switch, the duty cycle may be determined 1110 using the determined current to be applied. For example, the duty cycle may be determined by dividing the determined current to be applied by the maximum current available. The duty cycle may be applied 1108 to the SMA wire. For example, if the determined duty cycle is 60% of the duty cycle at room temperature, the determined duty cycle may be applied 1108 based on applying the available current (e.g., 3 amperes) for 60% of the desired unlocked period of time (e.g., the amount of time that the locking mechanism should remain open).

In some embodiments, it may be desirable to maintain the SMA wire at a desired length. For example, as the SMA wire contracts, the lever arm 576 may rotate about the pin 573 until it reaches a desired position. The temperature of the SMA wire may be held at this point to maintain the desired length of the SMA wire (e.g., the position of the lever arm.

In the embodiment illustrated in FIGS. 5-1 through 5-3, the locking mechanism 520 may include a limit switch 578-2. The limit switch 578-2 may be used during the unlocking process (e.g., the method 1100 for unlocking a locking mechanism) to control the SMA wire temperature. For example, when a current and/or duty cycle is applied to the SMA wire, the lever arm 576 may pivot about the pin 573 until the lever arm 576 contacts (e.g., switches) the limit switch 578-2. This may occur when the SMA wire has contracted to its desired length. Upon contacting the limit switch 578-2, the current may stop being applied, but then the lever arm 576 will start to move back toward the undocked position. When the lever arm 576 loses contact with the limit switch, then the current and/or duty cycle may be reapplied 1108. This may continue until a desired time to remain unlocked has been achieved at which point the method 1100 may stop. In other words, the locking mechanism may relock after a desired period of time.

In some cases, the locking mechanism 520 may become bound such that the SMA wire 578 is not capable of moving the connector 574. For instance, if a user were to apply a large force (e.g., 100 Newtons), the locking mechanism 520 may become bound and unable to unlock. In some embodiments, a manual override 579 may be included. The manual override 579 may be connected to the actuator 570. As shown, the manual override 579 may be connected to the rocker arm 577. In other embodiments, the manual override 579 may be connected to other components of the locking mechanism 520. For example, the manual override 579 may be connected to the carrier 550 and/or the lever arm 576.

The manual override 579 may be activated by applying a force at least partially in the direction of the SMA wire 578. The applied force alone or in combination with heating the SMA wire 578 may cause the connector 574 to move toward the end of the SMA wire 578. Referring briefly back to FIG. 2, the computing device 100 may include an opening 179 through which an elongate protrusion (e.g., a paperclip) may be inserted to activate the manual override 579.

Although not illustrated as such, the locking mechanism 520 may include a slip clutch (such as slip clutch 475). Likewise, the actuator 470 of the embodiment of a locking mechanism 420 shown in FIGS. 4-1 through 4-3 may use the electronic actuator 570 described in the embodiment of a locking mechanism 520 shown in FIGS. 5-1 through 5-3. For example, the SMA wire 578 may loop through the connector 474. In another example, one end of the SMA wire 578 may be connected to the connector 474 with the other end of the SMA wire 578 being connected to the locking mechanism 420. In a still further example, an SMA wire 578 may be connected directly to the slider 472 such that heating of the SMA wire 578 may pull the slider toward the top of the locking mechanism 420.

Figure 6:
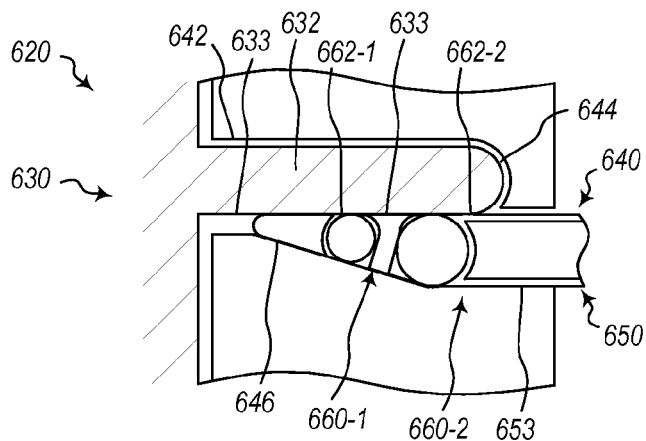
FIG. 6 is a right cutaway view of an embodiment of a locking mechanism in a locked configuration.

FIG. 6 is a right cutaway view of an embodiment of a locking mechanism 620 in a locked configuration. The locking mechanism 620 may be similar to the locking mechanism 320. For example, the locking mechanism 620 may include a locking protrusion 630, a locking receptacle 640, and a carrier 650. However, the locking mechanism 620 may include more than one rotating lock 660. In the illustrated embodiment, the locking mechanism 620 may include a first rotating lock 660-1 and a second rotating lock 660-2.

As illustrated in FIG. 3-2-1, the forces applied to the locking mechanism 320 are applied to a single point along the front surface 362 of the rotating lock 360. As shown in FIG. 6, the forces applied to the locking mechanism 620 are split between two points along the front surfaces 662-1, 662-2 of the first and second rotating locks 660-1, 660-2.

In embodiments with two points of contact, splitting the force over two points of contact may improve the locking mechanism's ability to resist free play about $\theta_x$. For example, for a single point of contact, a locking protrusion (e.g., locking protrusion 330) may pivot about that single point of contact within the locking receptacle while for two points of contact, the locking protrusion (e.g., locking protrusion 630) may be prevented from pivoting. As with the rotating lock 360 of FIG. 3-2-1, the first rotating lock 660-1 and the second rotating lock 660-2 may ride on a tapered surface 646 of the locking receptacle 640.

The components of the locking mechanism 620 may be used with any other locking mechanism disclosed herein. For example, the carrier 650 and the first and second rotating lock 660-1, 660-2 may be used in conjunction with the locking mechanisms 420, 520 of FIGS. 4-1 through 5-3.

Figure 7:
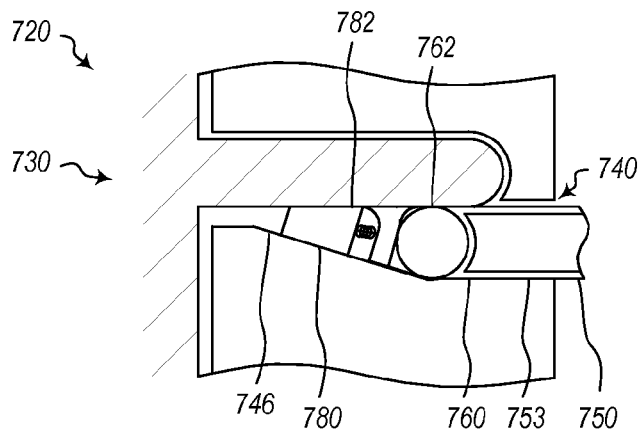
FIG. 7 is a right cutaway view of another embodiment of a locking mechanism in a locked configuration.

FIG. 7 is a right cutaway view of another embodiment of a locking mechanism 720 in a locked configuration. The locking mechanism 720 may be similar to the locking mechanism 320 shown in FIGS. 3-1 through 3-3. For example, the locking mechanism 720 may include a locking protrusion 730, a locking receptacle 740, a carrier 750, and a rotating lock 760. However, the locking mechanism 720 may include an elastic wedge 780. The elastic wedge 780 is shown conceptually as being elastically connected (via a spring) to the carrier 750. In other embodiments, the elastic wedge 780 may be integrally formed with the carrier 750.

Similar to the double rotating locks 660-1, 660-2 in FIG. 6, as shown in FIG. 7, the forces applied to the locking mechanism 720 are split between two points, the front surface 782 of the elastic wedge 780 and the front surface 762 of the rotating lock 760.

The components of the locking mechanism 720 may be used with any other locking mechanism disclosed herein. For example, the elastic wedge 780 may be used with any carrier described herein.

Figure 8:
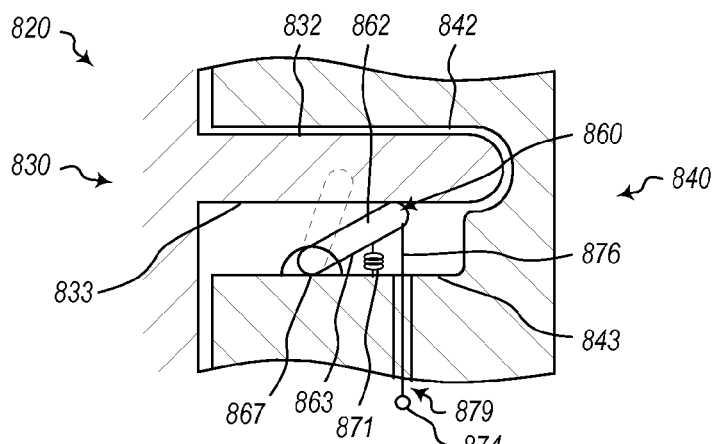
FIG. 8 is a right cutaway view of a further embodiment of a locking mechanism in a locked configuration with an undocked configuration shown in phantom.

FIG. 8 is a right cutaway view of a further embodiment of a locking mechanism 820 in a locked configuration with an undocked configuration shown in phantom. The locking mechanism 820 may be similar to the locking mechanisms 320, 620, 720 previously described. For example, the locking mechanism 820 may include a locking protrusion 830, a locking receptacle 840, and a rotating lock. However, the rotating lock may be a cam 860. The cam 860 may pivot about a point 867 on the back surface 843 of the locking receptacle 840. The cam 860 may include a front surface 862 and a back surface 863.

In the undocked configuration, the cam 860 may pivot toward the bottom of the locking mechanism 820 (as shown in phantom). When the locking protrusion 830 is inserted into the locking receptacle 840, a top surface 834 of the locking protrusion 830 may abut the front surface 862 of the cam 860. As the locking protrusion 830 is inserted further into the locking receptacle 840, the cam 860 may abut the back surface 833 of the locking protrusion 830, transitioning the locking mechanism 820 into the locked configuration.

The cam 860 may be biased (via spring 871) toward the front and bottom of the locking receptacle 840. Similar to the single rotating lock 360 in FIGS. 3-1 through 3-3, the forces applied to the locking mechanism 820 are at a single point. Also, similar to the rotating lock 360, the cam 860 may limit the motion of the locking protrusion 830 toward the bottom of the locking mechanism 820 by applying forces similar to the forces illustrated in FIG. 3-2-1. The biasing force of the spring 871 may be applied to the back surface 863 of the cam 860. The frictional force of the front surface 862 of the cam 860 may be applied to the back surface 833 of the locking protrusion 830. A frictional force of the front surface 842 of the locking receptacle 840 may be applied to the front surface 832 of the locking protrusion 830. The combination of these forces may limit the movement of the locking protrusion 830 toward the bottom of the locking mechanism 820, similar to the forces applied in FIG. 3-2-1.

A lever arm 876 may be connected to the back surface 863 of the cam 860. The lever arm 876 may pass through an opening 879 and/or may have a connector 874. An actuator (not shown), such as any of the actuators described herein, may be used to transition the cam 860 from the locked configuration to the unlocked configuration, where the lever arm 876 pulls the cam 860 back toward the back surface 843 of the locking receptacle 840, thereby disengaging the cam 860 from the locking protrusion.

The components of the locking mechanism 820 may be used with any other locking mechanism disclosed herein. For example, the cam 860 may be used instead of or in conjunction with any rotating lock described herein.

Figure 9:
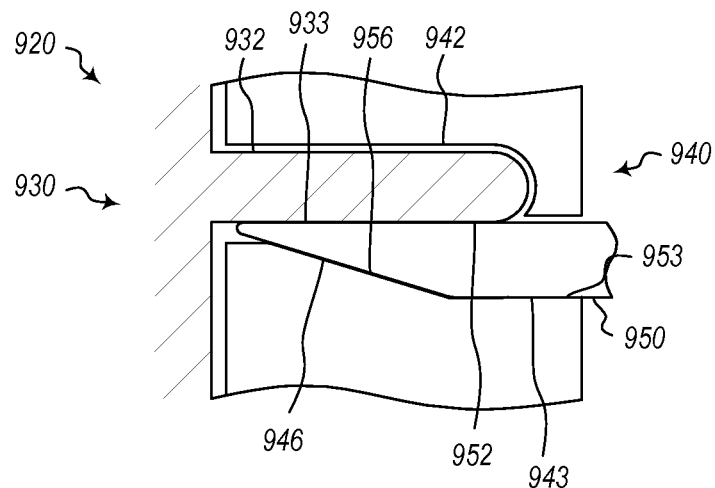
FIG. 9 is a right cutaway view of a still further embodiment of a locking mechanism in a locked configuration.

FIG. 9 is a right cutaway view of a still further embodiment of a locking mechanism 920 in a locked configuration. The locking mechanism 920 may be similar to the locking mechanisms 320, 620, 720, 820 previously described. For example, the locking mechanism 920 may include a locking protrusion 930, a locking receptacle 940, and a carrier 950. However, unlike the previous embodiments, the locking mechanism 920 does not include a rotating lock. Instead the carrier 950 acts to wedge the locking protrusion 930 against a back surface 943 of the locking receptacle 940. In the locked configuration, the front surface 932 of the locking protrusion 930 abuts the front surface 942 of the locking protrusion and the back surface 933 of the locking protrusion 930 abuts the front surface 852 of the carrier 850. The back surface 953 and the tapered surface 956 of the carrier 950 abut the back surface 943 and the tapered surface 946 of the locking receptacle 940, respectively. A biasing or other force may bias the carrier 950 toward the bottom of the locking mechanism 920 such that the carrier 950 becomes wedged into the locking protrusion 930. An actuator, such as one of the actuators described herein, may be used to transition the carrier 950 to an unlocked configuration.

The components of the locking mechanism 920 may be used with any other locking mechanism disclosed herein. For example, the carrier 950 may be used instead of or in conjunction with any rotating lock described herein.

Figure 10:
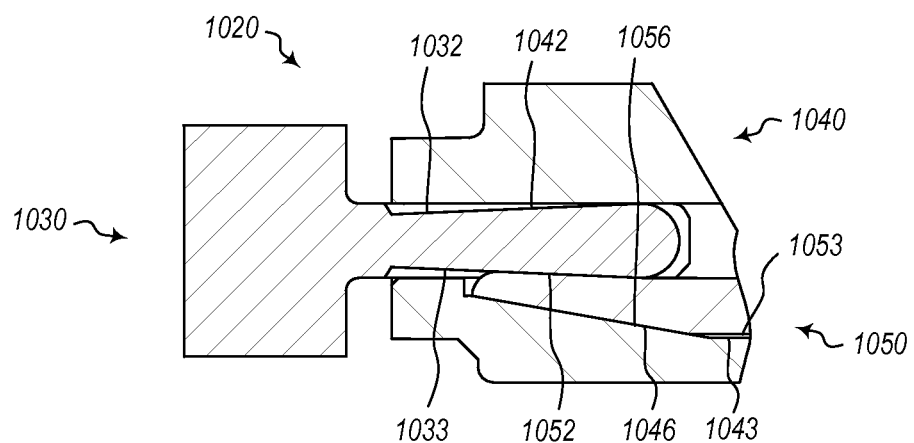
FIG. 10 is a right cutaway view of a yet further embodiment of a locking mechanism in a locked configuration.

FIG. 10 is a right cutaway view of a yet further embodiment of a locking mechanism 1020 in a locked configuration. The locking mechanism 1020 may be similar to the locking mechanisms 320, 620, 720, 820, 920 previously described. For example, the locking mechanism 1020 may include a locking protrusion 1030, a locking receptacle 1040, and a carrier 1050. Like the embodiment of FIG. 9, the locking mechanism 1020 does not include a rotating lock. Instead the carrier 1050 acts to wedge the locking protrusion 1030 against a back surface 1042 of the locking receptacle 1040. Unlike the embodiment of FIG. 9, the locking protrusion 1030 may be flared (e.g., increase in cross-sectional area from the bottom toward the top).

In the locked configuration, the front surface 1032 of the locking protrusion 1030 abuts the front surface 1042 of the locking receptacle and the tapered surface 1056 of the carrier 1050 abuts the tapered surface 1046 of the locking receptacle 1040. The back surface 1033 of the locking protrusion 1030 abuts the front surface 1052 of the carrier 1050. Because the locking protrusion 1030 is flared, the carrier 1050 may act as both a wedge and as a positive lock (e.g., applying a force opposing the removal of the locking protrusion 1030 from the locking receptacle 1040). The carrier 1050 may oppose removal of the locking protrusion 1030 because the front surface 1052 of the carrier 1050 undercuts (e.g., extends toward the front beyond a plane parallel to the y-axis and through the backmost portion of the locking protrusion 1030) the back surface 1033 of the locking protrusion. A biasing or other force may bias the carrier 1050 toward the bottom of the locking mechanism 1020 such that the carrier 1050 becomes wedged into and positively interferes with the locking protrusion 1030. An actuator, such as one of the actuators described herein, may be used to transition the carrier 1050 to an unlocked configuration.

The components of the locking mechanism 1020 may be used with any other locking mechanism disclosed herein.

For example, the carrier 1050 may be used instead of or in conjunction with any rotating lock described herein.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount.

Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

Embodiments of the present invention may comprise or utilize a special purpose or general-purpose computer including computer hardware, as discussed above.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing device comprising:
   a first portion;
   a second portion separably connected to the first portion;
   a locking mechanism configured to lock the first portion to the second portion, the locking mechanism includes a locking receptacle connected to the first portion and a locking protrusion connected to the second portion, the locking receptacle including a rotating lock and having an aperture through which the locking protrusion is insertable;
   an actuator mechanically coupled to the locking mechanism and configured to transition the first portion and the second portion between a locked configuration and an unlocked configuration, wherein the actuator includes a SMA wire and wherein transitioning the locking mechanism further comprises heating the SMA wire to transition the locking mechanism; and
a thermistor to measure ambient temperature near the SMA wire and wherein heating the SMA wire to unlock transition the locking mechanism further comprises heating the SMA wire based on the ambient temperature near the SMA wire.

2. The computing device of claim 1, wherein unlocking the locking mechanism further comprises heating the SMA wire to transition the locking mechanism.

3. The computing device of claim 1, wherein the SMA wire is connected to the rotating lock to retract the rotating lock from contact with the locking protrusion.

4. The computing device of claim 1, wherein the SMA wire is biased to be in tension and the rotating lock is biased toward an undocked configuration using a single spring.

5. The computing device of claim 1, wherein the rotating lock is housed within a carrier that is connected to the actuator.

6. The computing device of claim 1, wherein the locking receptacle includes a tapered surface that contacts the rotating lock.

7. The computing device of claim 1, wherein the rotating lock is biased toward the locking protrusion.

8. The computing device of claim 1, wherein the locking mechanism is configured to allow a reversible connection between the first portion and the second portion.

9. The computing device of claim 1, wherein the rotating lock is selected from the group consisting of a sphere, a spheroid, a cylinder, a gimbal, and a cam.

10. The computing device of claim 1, wherein the aperture of the locking receptacle has a rounded edge.

11. The computing device of claim 1, further comprising a mechanical override to unlock the locking mechanism.

12. A computing device comprising:
a first portion;
a second portion separably connected to the first portion;
a locking mechanism configured to lock the first portion to the second portion;
an actuator mechanically coupled to the locking mechanism and configured to transition the first portion and the second portion between a locked configuration and an unlocked configuration, wherein the actuator includes an SMA wire and wherein transitioning the locking mechanism further comprises heating the SMA wire to transition the locking mechanism;
a processor in electronic communication with the actuator; and
memory including instructions that are executable by the processor to cause the actuator to transition the locking mechanism upon receipt of an instruction to transition.

13. The computing device of claim 12, wherein the processor is located on the first portion and further comprising a different processor on the second portion.

14. The computing device of claim 12, wherein the instructions further comprise an act of waiting a predetermined time after receiving the instruction to transition before causing the actuator to unlock the locking mechanism between a locked configuration and an unlocked configuration.

15. The computing device of claim 12, wherein the instructions further comprise an act of relocking the locking mechanism after a predetermined period of time.

16. The computing device of claim 12, further comprising a thermistor to measure ambient temperature near the SMA wire and wherein heating the SMA wire to transition the locking mechanism further comprises heating the SMA wire based on the ambient temperature near the SMA wire.

17. The computing device of claim 12, further comprising a mechanical override to unlock the locking mechanism.

18. A computing device, comprising:
a first portion that includes a display screen;
a second portion that includes an input device and that is separably connected to the first portion;
a locking mechanism configured to lock the first portion to the second portion, the locking mechanism includes a locking receptacle connected to the first portion and a locking protrusion connected to the second portion, the locking receptacle including a rotating lock and having an aperture through which the locking protrusion is insertable;
an actuator mechanically coupled to the locking mechanism and configured to transition the first portion and the second portion between a locked configuration and an unlocked configuration, the actuator including a SMA wire and a power source connected to the SMA wire, wherein transitioning the locking mechanism further comprises heating the SMA wire to transition the locking mechanism;
one or more magnets proximate the locking mechanism; and
a processor in electronic communication with the actuator and programmed to cause the actuator to transition the locking mechanism upon receipt of an instruction to transition by heating the SMA wire.

19. The computing device of claim 18, further comprising a rotating lock aperture in which the rotating lock is housed and, the rotating lock aperture being shaped to fit a cylinder having enlarged ends.

20. The computing device of claim 18, further comprising a mechanical override to unlock the locking mechanism.

* * * * *